(12) United States Patent
Sugita

(10) Patent No.: US 9,268,119 B2
(45) Date of Patent: Feb. 23, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 14/146,045

(22) Filed: Jan. 2, 2014

(65) Prior Publication Data

US 2014/0198393 A1    Jul. 17, 2014

(30) Foreign Application Priority Data

Jan. 11, 2013    (JP) ................ 2013-003237

(51) Int. Cl.
*G02B 15/14*    (2006.01)
*G02B 15/177*   (2006.01)
*G02B 15/173*   (2006.01)
*G02B 15/163*   (2006.01)

(52) U.S. Cl.
CPC ............ *G02B 15/177* (2013.01); *G02B 15/163* (2013.01); *G02B 15/173* (2013.01)

(58) Field of Classification Search
CPC ... G02B 15/173; G02B 15/177; G02B 15/163
USPC .................. 359/676, 686, 689, 691
See application file for complete search history.

(56) References Cited

U.S. PATENT DOCUMENTS 5,245,384 A * 9/1993 Mori ........................ 355/67

FOREIGN PATENT DOCUMENTS

JP    2008-046208 A    2/2008
JP    2008-233284 A    10/2008

* cited by examiner

*Primary Examiner* — James Greece
(74) *Attorney, Agent, or Firm* — Carter, DeLuca, Farrell & Schmidt, LLP

(57) ABSTRACT

A zoom lens including a plurality of lens units, and two variable stops having an aperture diameter changing for zooming, the lens units being configured to change intervals between the respective neighboring lens units for zooming, the zoom lens having an F-number which is constant over an entire zoom range, the two variable stops including a first variable stop disposed on an object side, and a second variable stop disposed on an image side. A distance (Sw1) from the first variable stop to an image plane at a wide-angle end, a distance (Sw2) from the second variable stop to the image plane at the wide-angle end, and a distance (Tkw) from an exit pupil position to the image plane at the wide-angle end are each set appropriately.

12 Claims, 14 Drawing Sheets

ZOOM LENS AND IMAGE PICKUP APPARATUS INCLUDING THE SAME

BACKGROUND OF THE INVENTION

1. Field of the Invention

The present invention relates to a zoom lens and is suitable as an imaging optical system used for an image pickup apparatus such as a digital still camera, a video camera, a TV camera, or a monitoring camera.

2. Description of the Related Art

Hitherto, a zoom lens having a wide angle of field is demanded for an image pickup apparatus such as a digital camera and an image projection apparatus such as a projector. As a zoom lens having a wide angle of field, there is known a zoom lens having a wide angle of field that can perform zooming from a wide angle range having an entire imaging angle of field of 100 degrees or larger. Usually, as the zoom lens having a wide angle of field, there is widely used a negative-lead type zoom lens, which includes, in order from an object side to an image side, a first lens unit having a negative refractive power, and a rear lens group that includes one or more lens units and has a positive refractive power as a whole.

As to the negative-lead type zoom lens, there is demanded a zoom lens having a wide angle of field and the same minimum f-number (maximum aperture) over the entire zoom range so that exposure change does not occur in zooming.

A zoom lens disclosed in Japanese Patent Application Laid-Open No. 2008-046208 includes a first lens unit having a negative refractive power, a second lens unit having a positive refractive power, a third lens unit having a negative refractive power, and a fourth lens unit having a positive refractive power. Japanese Patent Application Laid-Open No. 2008-046208 discloses a zoom lens having a wide angle of field, which has an entire imaging angle of field of 106 degrees at a wide-angle end, a zoom ratio of 2.1, and a minimum f-number of 2.8 over the entire zoom range. A zoom lens described in Japanese Patent Application Laid-Open No. 2008-233284 includes a first lens unit having a negative refractive power, and a second lens unit having a positive refractive power. Japanese Patent Application Laid-Open No. 2008-233284 discloses a zoom lens having a wide angle of field, which has an entire imaging angle of field of 113 degrees at the wide-angle end, a zoom ratio of 1.7, and a minimum f-number of 2.8 over the entire zoom range.

In the zoom lens having a wide angle of field described in Japanese Patent Application Laid-Open No. 2008-046208 or Japanese Patent Application Laid-Open No. 2008-233284, extreme peripheral light intensity of the screen is lower than or equal to 30% of that in the screen center at the wide-angle end. If a light intensity ratio in the extreme periphery of the screen is decreased in the lens having a wide angle of field in this way, a decrease of the extreme peripheral light intensity of the screen of a taken image can be recognized by eyes when a uniform luminance surface such as the sky is photographed, and the taken picture is not good.

In particular, in the zoom lens having a wide angle of field, in which the minimum f-number is constant over the entire zoom range as described in Japanese Patent Application Laid-Open No. 2008-046208 or Japanese Patent Application Laid-Open No. 2008-233284, a decrease of peripheral light intensity is apt to be conspicuous at the wide-angle end. The same is true not only for a retrofocus type optical system but also for a positive-lead type zoom lens including, in order from the object side to the image side, a first lens unit having a positive refractive power and a rear lens group including one or more lens units.

SUMMARY OF THE INVENTION

A zoom lens according to one embodiment of the present invention includes a plurality of lens units, and two variable stops having an aperture diameter changing for zooming, the lens units being configured to change intervals between the respective neighboring lens units for zooming, the zoom lens having an F-number which is constant over an entire zoom range, in which the two variable stops including a first variable stop disposed on an object side, and a second variable stop disposed on an image side, and in which the following conditional expressions are satisfied:

$0.90 < Sw1/Tkw < 1.50$, and $0.60 < Sw2/Tkw < 1.00$, where Sw1 represents a distance from the first variable stop to an image plane at a wide-angle end, Sw2 represents a distance from the second variable stop to the image plane at the wide-angle end, and Tkw represents a distance from an exit pupil position to the image plane at the wide-angle end.

Further features of the present invention will become apparent from the following description of exemplary embodiments with reference to the attached drawings.

DESCRIPTION OF THE EMBODIMENTS

Now, exemplary embodiments of the present invention are described in detail with reference to the attached drawings. The zoom lens according to the present invention includes multiple lens units and aperture stops, in which each interval between the lens units is changed for zooming, and an F-number is constant over the entire zoom range. Note that, "F-number is constant over the entire zoom range" in the zoom lens of the present invention does not mean to be strictly constant, and even varying within a range of ±10% is regarded as constant. Further, two variable stops having an aperture diameter that varies in accordance with a zoom position are disposed in an optical path.

Figure 1:
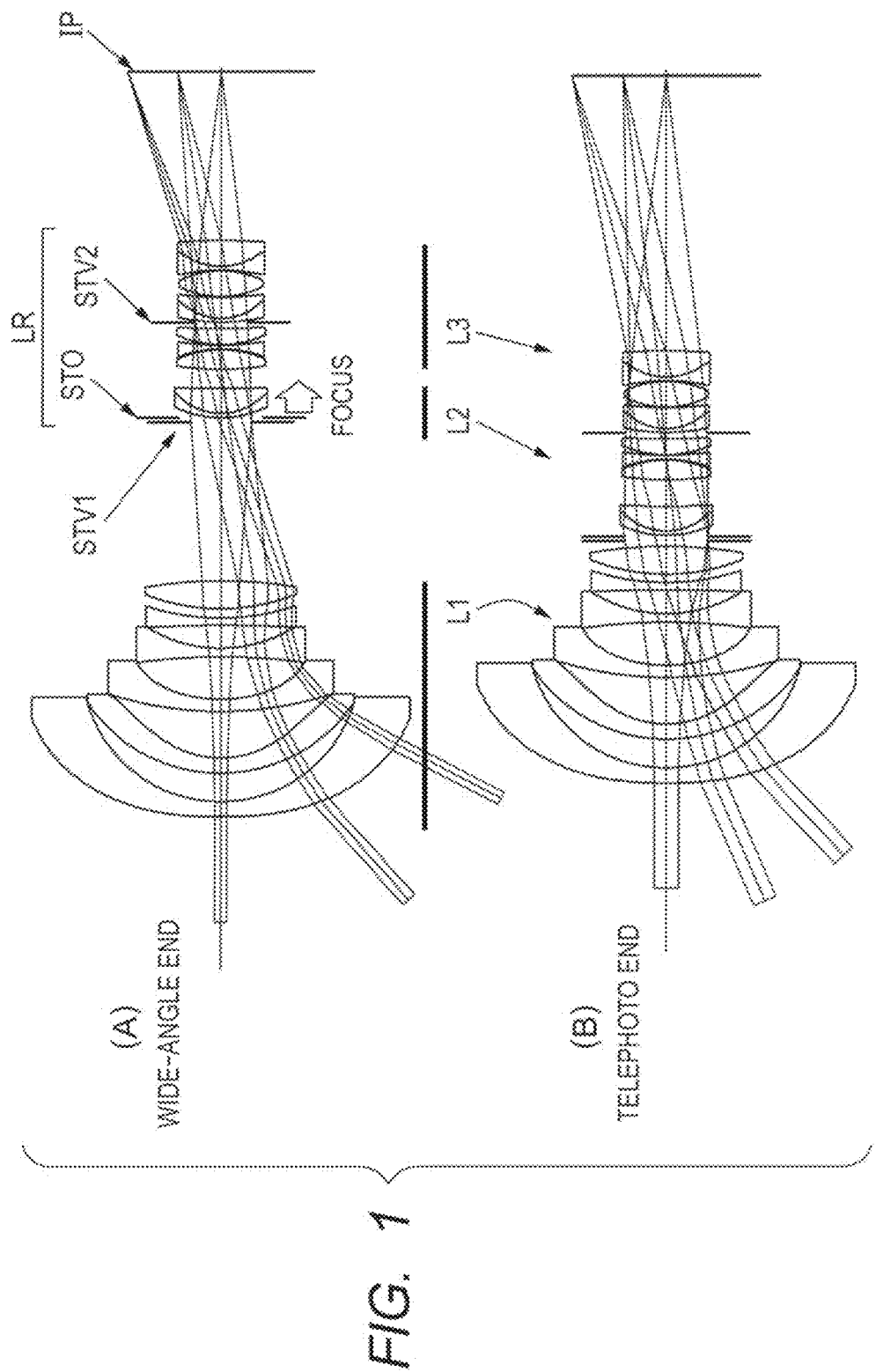
FIG. 1 is a cross-sectional view of a zoom lens of Embodiment 1 according to the present invention.
Figure 2:
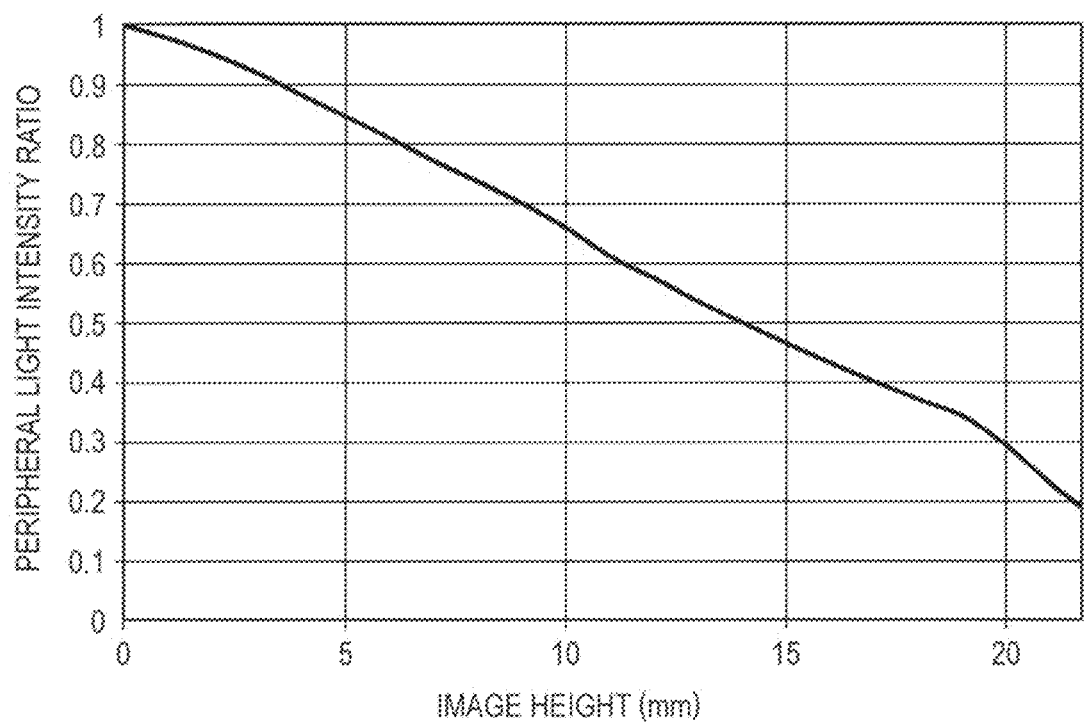
FIG. 2 is an explanatory diagram showing a relationship between an image height and peripheral light intensity in the zoom lens of Embodiment 1 according to the present invention.
Figure 3A:
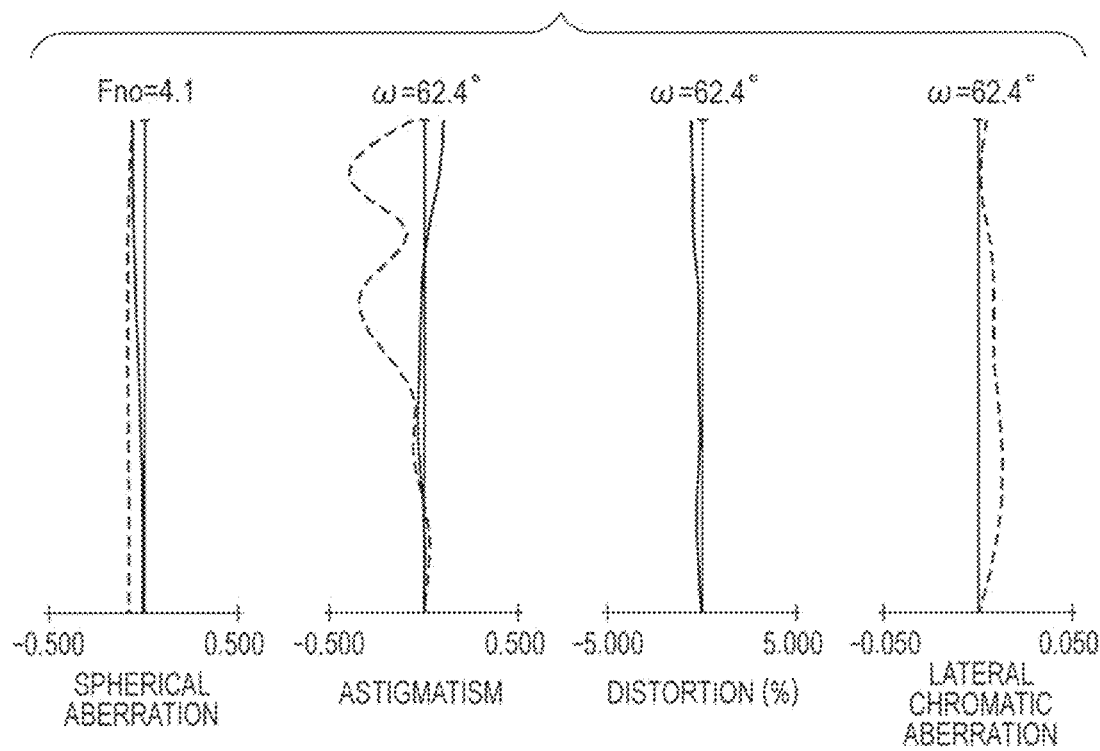
FIG. 3A is an aberration diagram in focus at infinity at a wide-angle end of the zoom lens of Embodiment 1 according to the present invention.
Figure 3B:
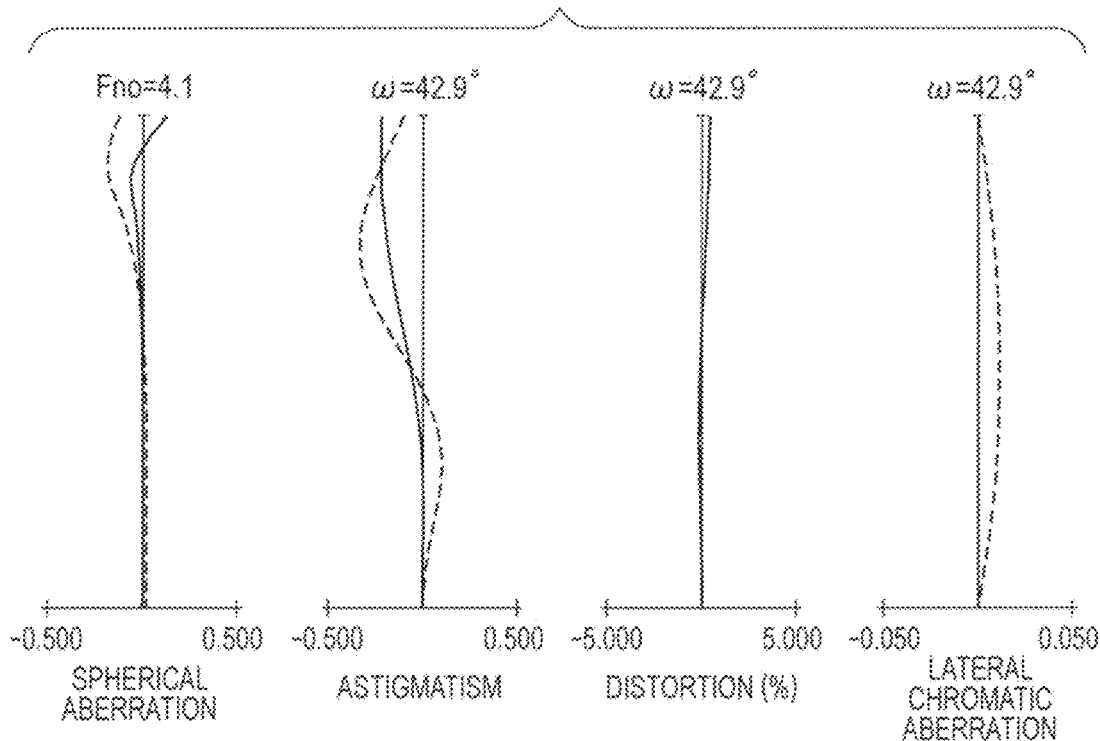
FIG. 3B is an aberration diagram in focus at infinity at a telephoto end of the zoom lens of Embodiment 1 according to the present invention.

FIG. 1 is a lens cross-sectional view of the zoom lens of Embodiment 1 of the present invention at a wide-angle end (short focal length end) (A) and at a telephoto end (long focal length end) (B). FIG. 2 is an explanatory diagram showing a relationship between an image height and a peripheral light intensity ratio of the zoom lens of Embodiment 1 of the present invention. FIGS. 3A and 3B are aberration diagrams of the zoom lens of Embodiment 1 in focus at infinity at the wide-angle end and at the telephoto end, respectively. The zoom lens of Embodiment 1 has a zoom ratio of 2.06 and an aperture ratio of 4.10.

Figure 4:
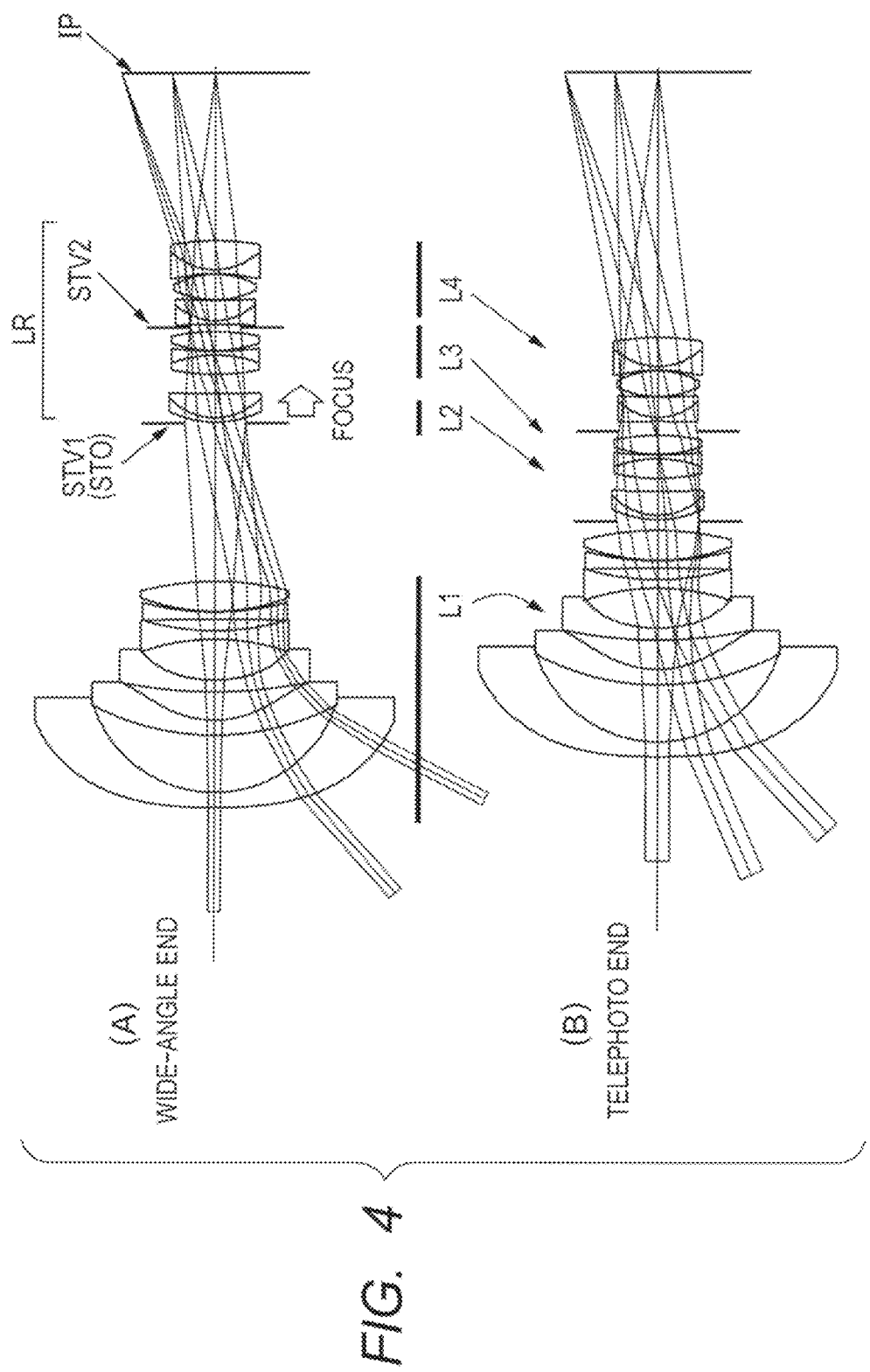
FIG. 4 is a cross-sectional view of a zoom lens of Embodiment 2 according to the present invention.
Figure 5:
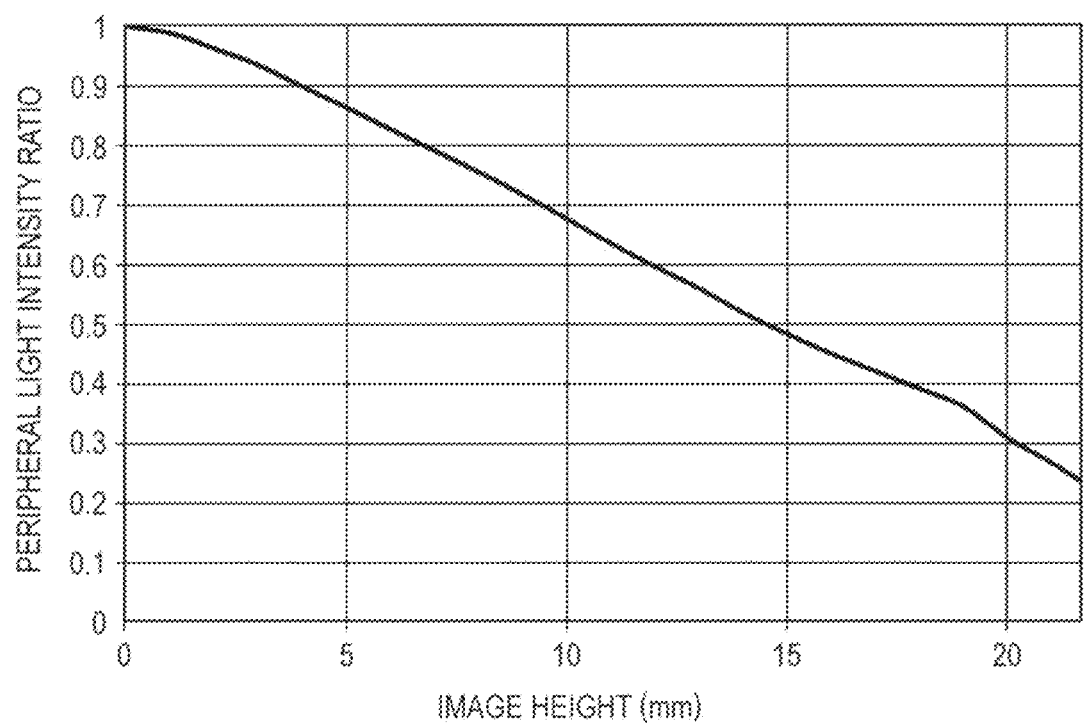
FIG. 5 is an explanatory diagram showing a relationship between an image height and peripheral light intensity in the zoom lens of Embodiment 2 according to the present invention.
Figure 6A:
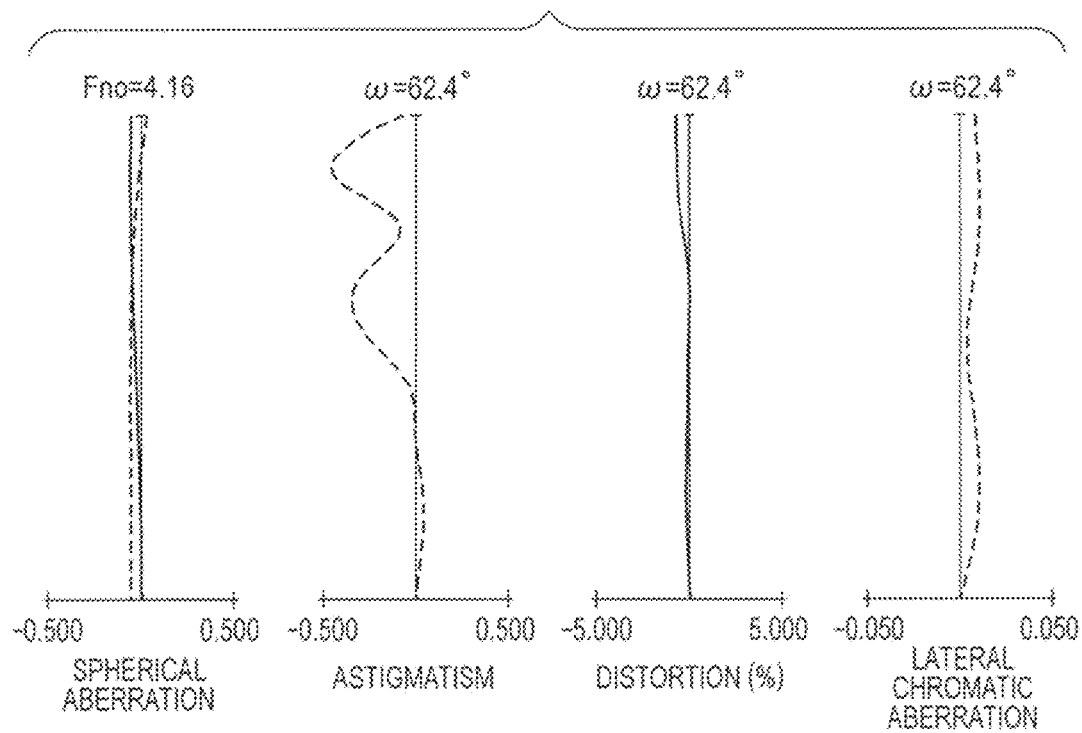
FIG. 6A is an aberration diagram in focus at infinity at the wide-angle end of the zoom lens of Embodiment 2 according to the present invention.
Figure 6B:
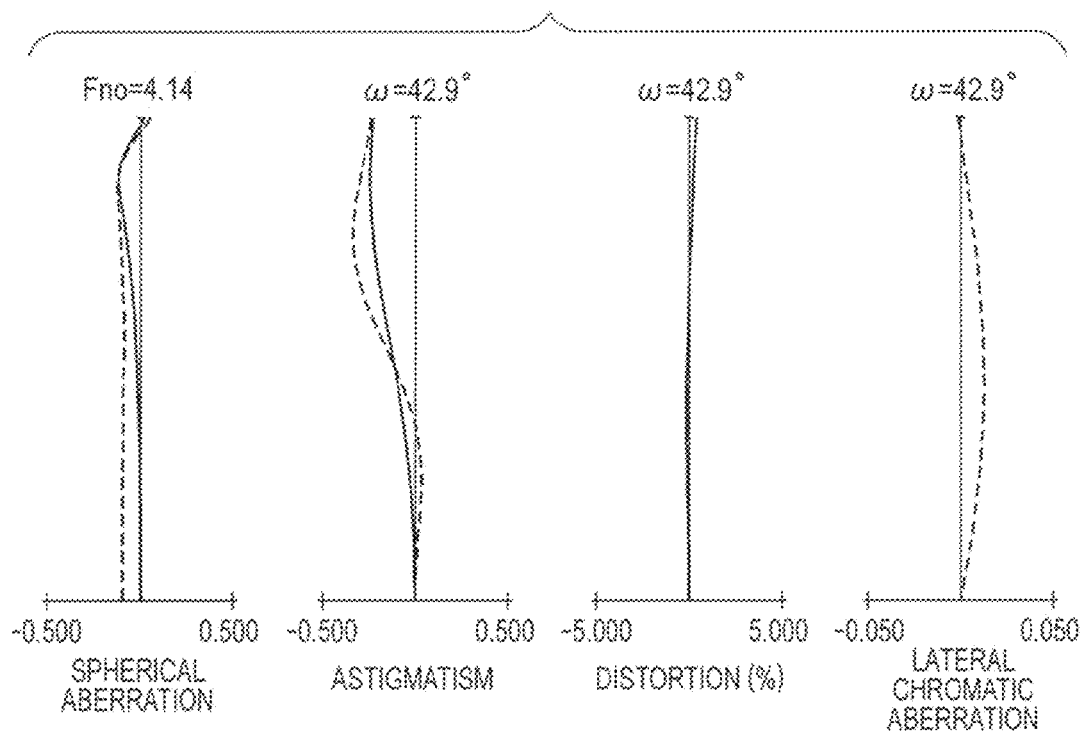
FIG. 6B is an aberration diagram in focus at infinity at the telephoto end of the zoom lens of Embodiment 2 according to the present invention.

FIG. 4 is a lens cross-sectional view of the zoom lens of Embodiment 2 of the present invention at a wide-angle end (A) and at a telephoto end (B). FIG. 5 is an explanatory diagram showing a relationship between an image height and a peripheral light intensity ratio of the zoom lens of Embodiment 2 of the present invention. FIGS. 6A and 6B are aberration diagrams of the zoom lens of Embodiment 2 in focus at infinity at the wide-angle end and at the telephoto end, respectively. The zoom lens of Embodiment 2 has a zoom ratio of 2.06 and an aperture ratio of 4.10.

Figure 7:
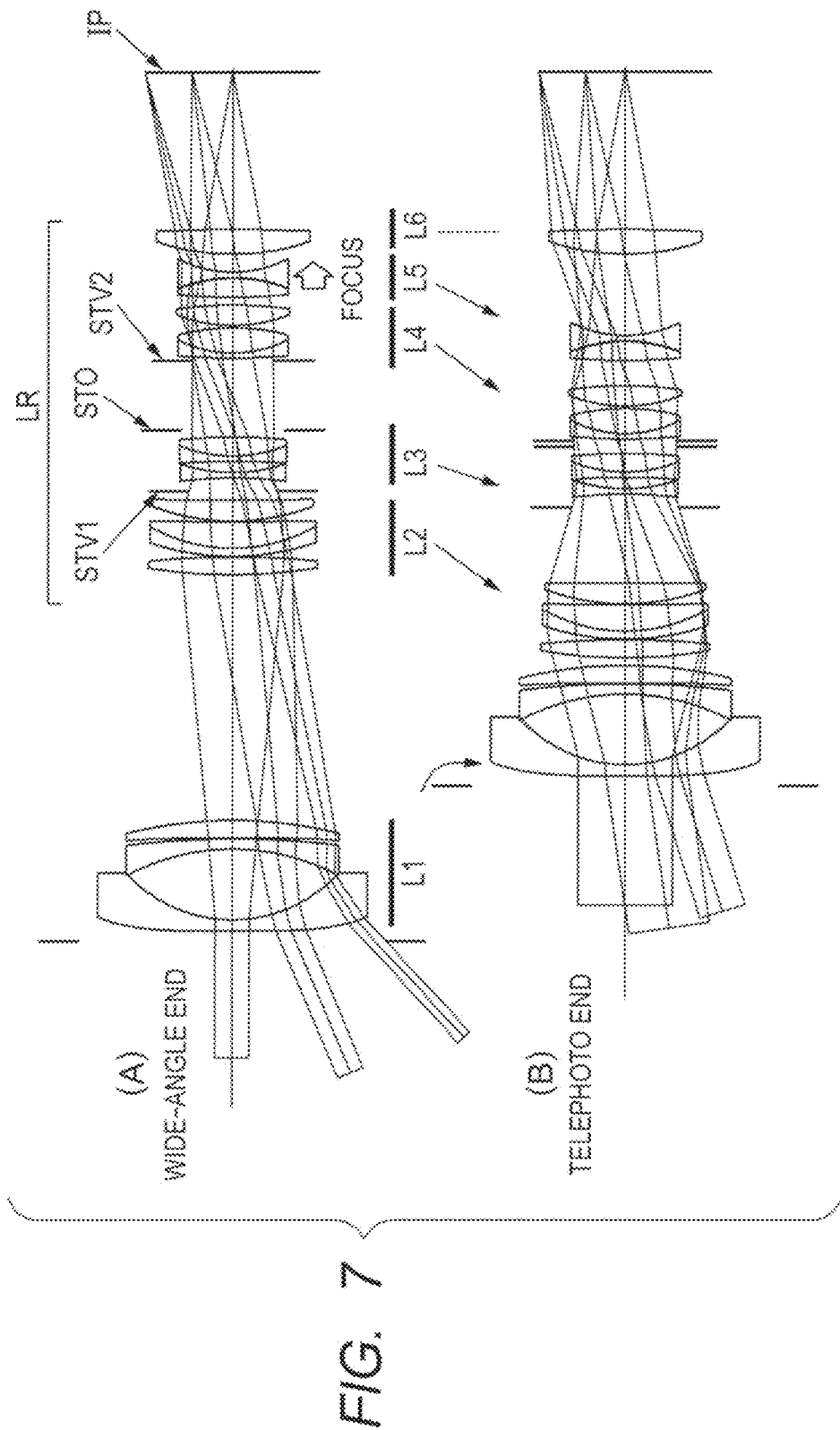
FIG. 7 is a cross-sectional view of a zoom lens of Embodiment 3 according to the present invention.
Figure 8:
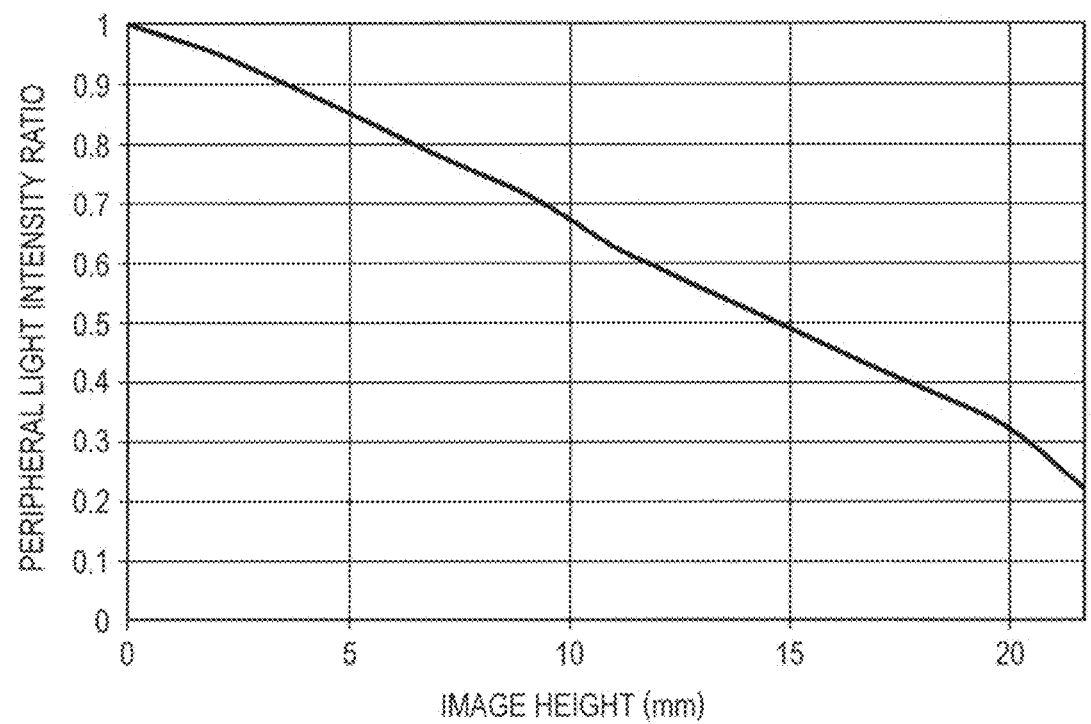
FIG. 8 is an explanatory diagram showing a relationship between an image height and peripheral light intensity in the zoom lens of Embodiment 3 according to the present invention.
Figure 9A:
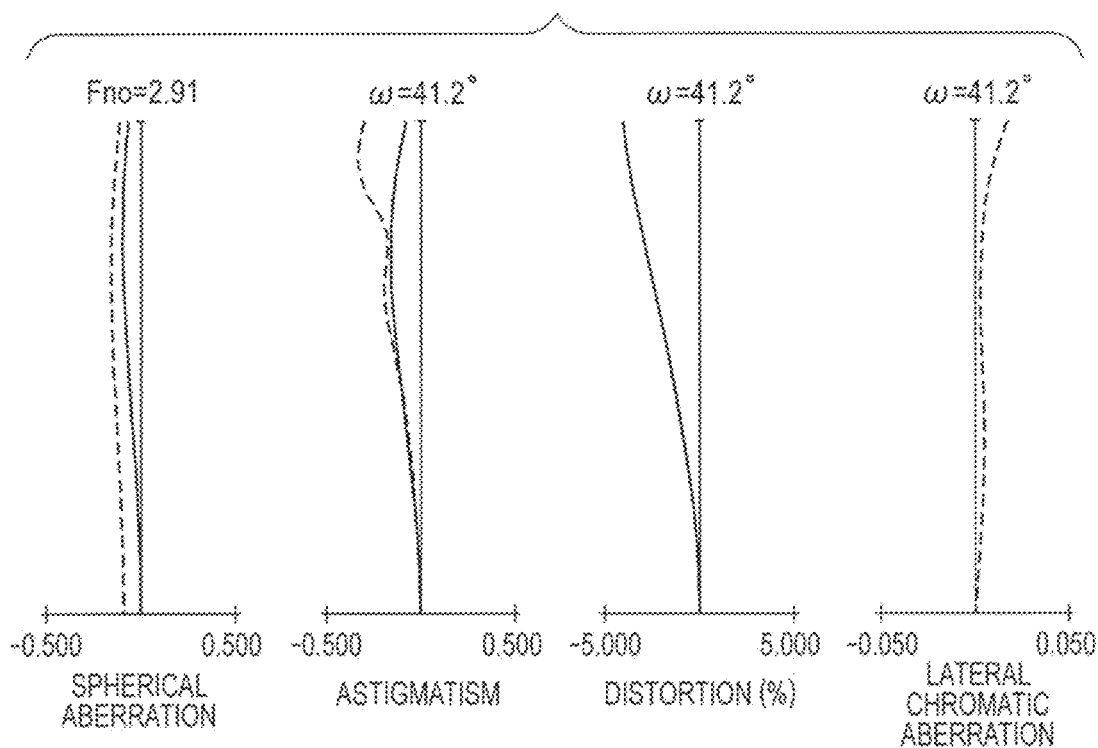
FIG. 9A is an aberration diagram in focus at infinity at the wide-angle end of the zoom lens of Embodiment 3 according to the present invention.
Figure 9B:
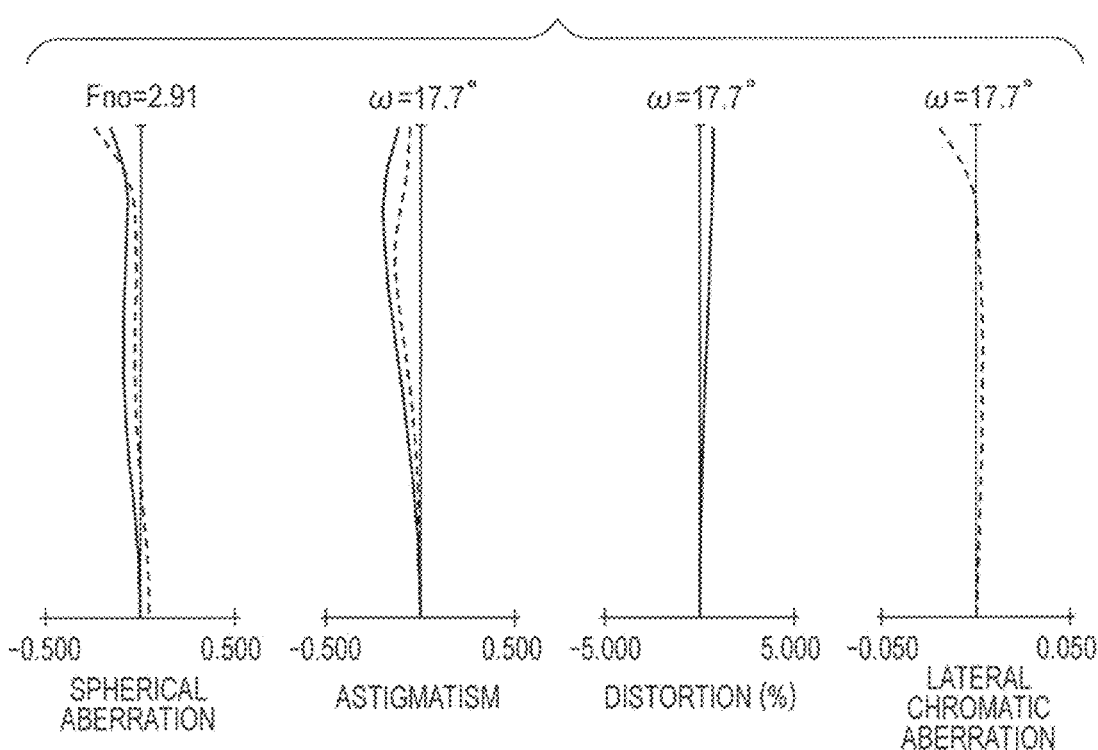
FIG. 9B is an aberration diagram in focus at infinity at the telephoto end of the zoom lens of Embodiment 3 according to the present invention.

FIG. 7 is a lens cross-sectional view of the zoom lens of Embodiment 3 of the present invention at a wide-angle end (A) and at a telephoto end (B). FIG. 8 is an explanatory diagram showing a relationship between an image height and a peripheral light intensity ratio of the zoom lens of Embodiment 3 of the present invention. FIGS. 9A and 9B are aberration diagrams of the zoom lens of Embodiment 3 in focus at infinity at the wide-angle end and at the telephoto end, respectively. The zoom lens of Embodiment 3 has a zoom ratio of 2.75 and an aperture ratio of 2.91.

Figure 10:
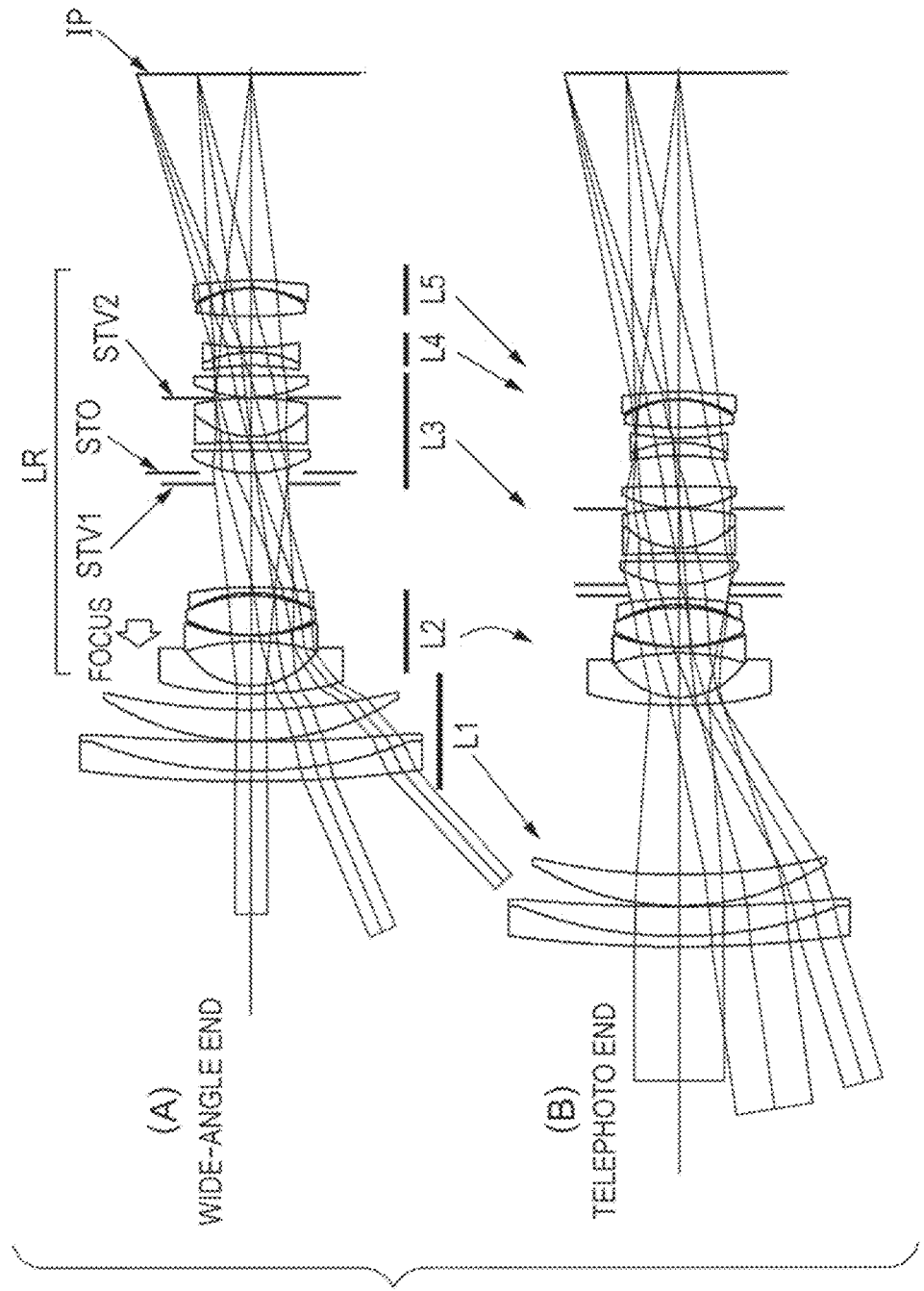
FIG. 10 is a cross-sectional view of a zoom lens of Embodiment 4 according to the present invention.
Figure 11:
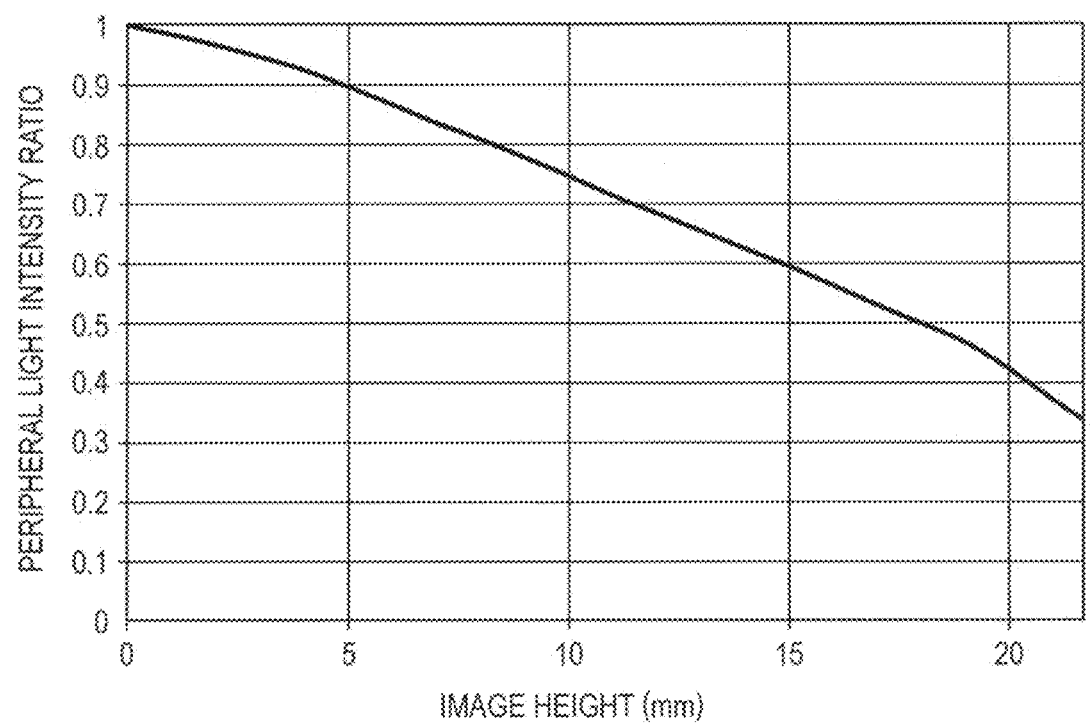
FIG. 11 is an explanatory diagram showing a relationship between an image height and peripheral light intensity in the zoom lens of Embodiment 4 according to the present invention.
Figure 12A:
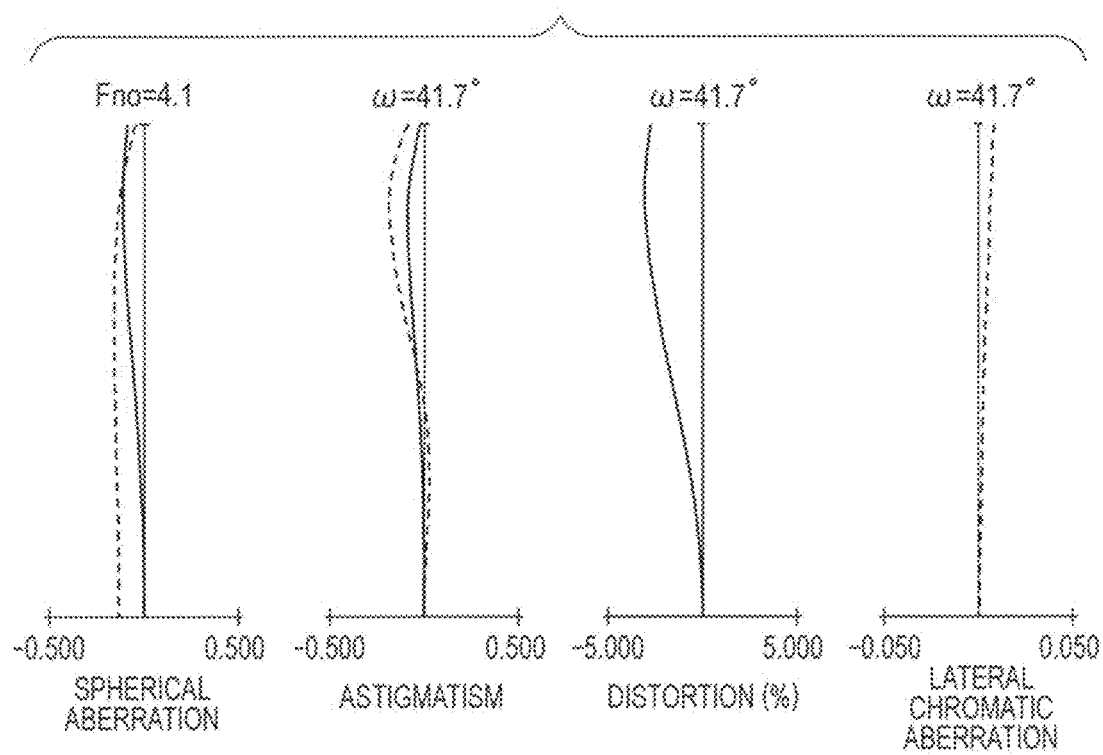
FIG. 12A is an aberration diagram in focus at infinity at the wide-angle end of the zoom lens of Embodiment 4 according to the present invention.
Figure 12B:
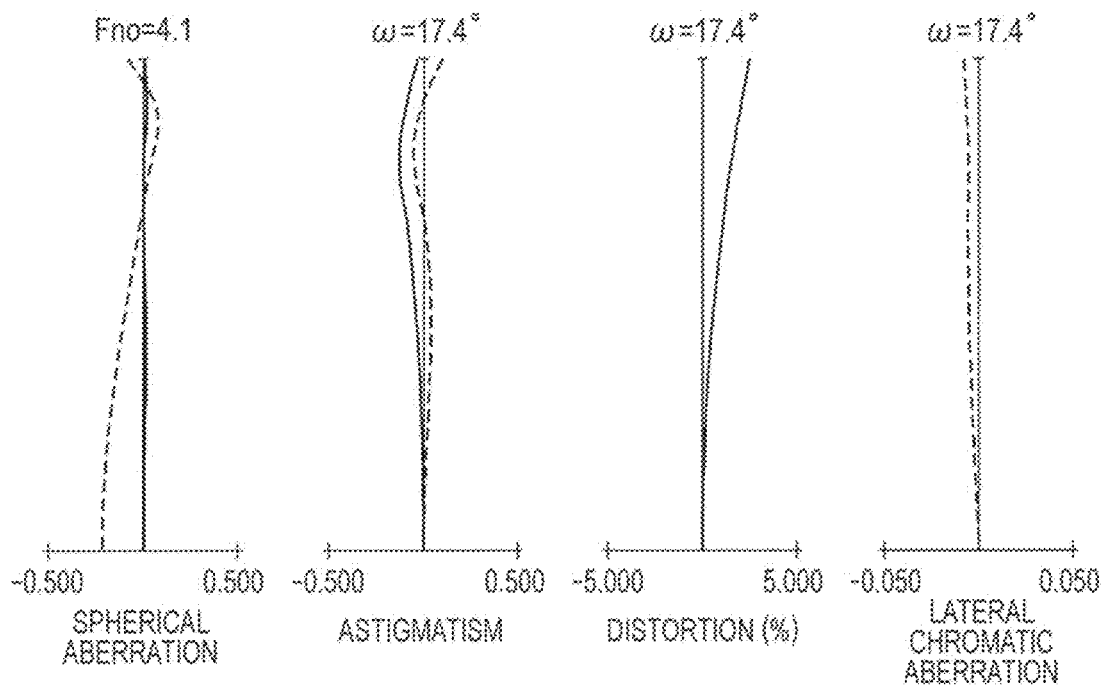
FIG. 12B is an aberration diagram in focus at infinity at the telephoto end of the zoom lens of Embodiment 4 according to the present invention.

FIG. 10 is a lens cross-sectional view of the zoom lens of Embodiment 4 of the present invention at a wide-angle end (A) and at a telephoto end (B). FIG. 11 is an explanatory diagram showing a relationship between an image height and a peripheral light intensity ratio of the zoom lens of Embodiment 4 of the present invention. FIGS. 12A and 12B are aberration diagrams of the zoom lens of Embodiment 4 in focus at infinity at the wide-angle end and at the telephoto end, respectively. The zoom lens of Embodiment 4 has a zoom ratio of 2.84 and an aperture ratio of 4.10.

Figure 13:
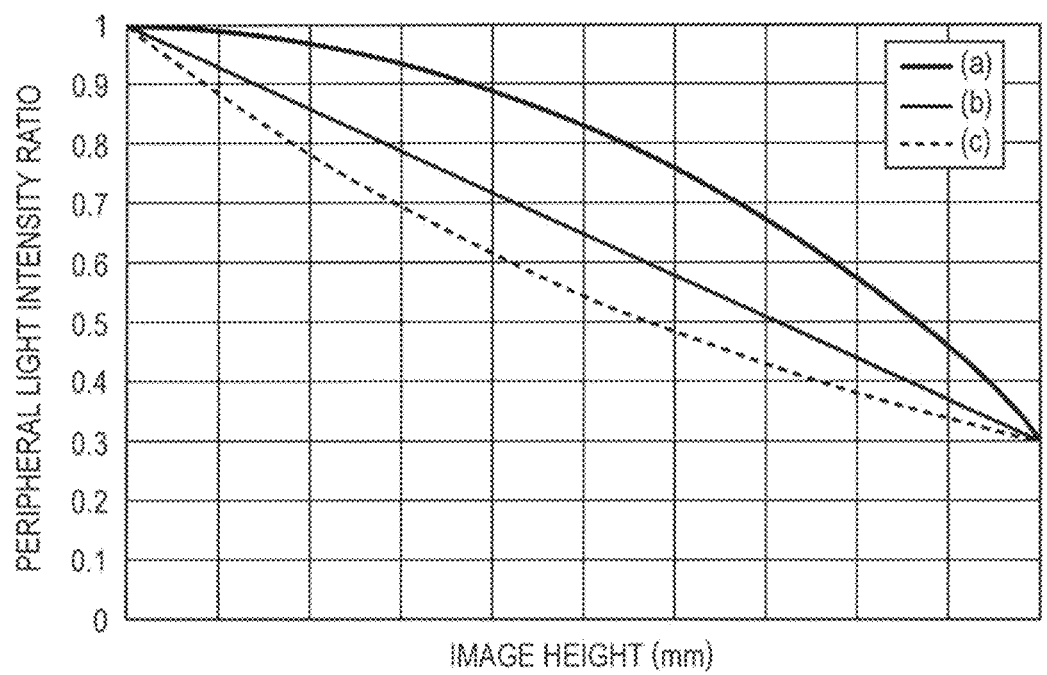
FIG. 13 is an explanatory diagram showing a relationship between an image height and peripheral light intensity.
Figure 14A:
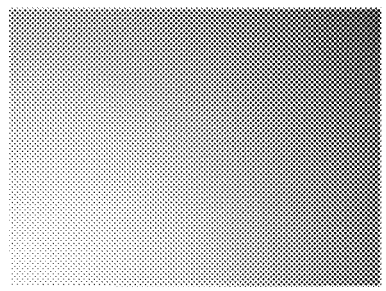
FIG. 14A is a luminance distribution comparison diagram on an image plane when photographing a uniform luminance surface.
Figure 14B:
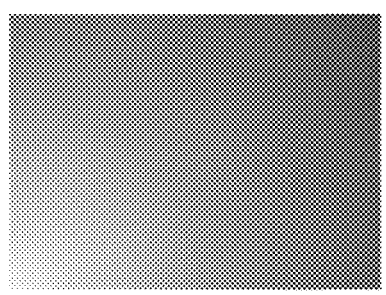
FIG. 14B is a luminance distribution comparison diagram on the image plane when photographing a uniform luminance surface.
Figure 14C:
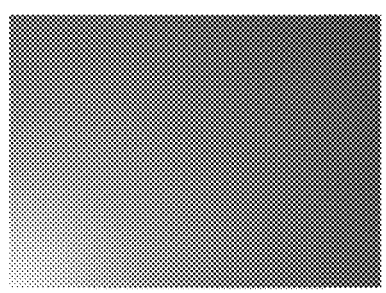
FIG. 14C is a luminance distribution comparison diagram on the image plane when photographing a uniform luminance surface.
Figure 15:
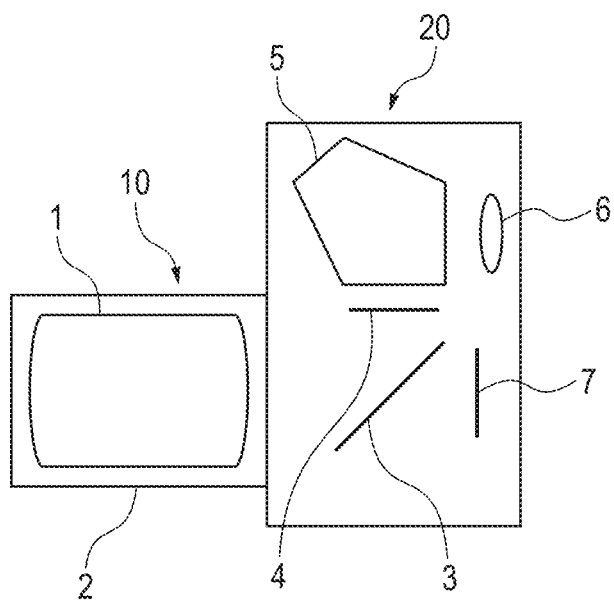
FIG. 15 is a schematic diagram of a main part of an image pickup apparatus of the present invention.

FIG. 13 is a graph showing a relationship between the image height and the peripheral light intensity. FIGS. 14A, 14B, and 14C are comparison diagrams of luminance distribution images (of the upper right part when picked-up images are equally divided into four parts of upper right, upper left, lower right, and lower left) on an image plane when photographing a uniform luminance surface. FIG. 15 is a schematic diagram of a main part of a digital still camera (image pickup apparatus) equipped with the zoom lens of the present invention. In the lens cross-sectional view, the left side is the object side (front side), and the right side is the image side (rear side).

In the lens cross-sectional view, Li represents the i-th lens unit, in which "i" indicates an order of the lens units from the object side to the image side. In FIGS. 1, 4, and 7, LR represents a rear lens group that includes one or more lens units and has a positive refractive power as a whole over the entire zoom range. STO represents an F-number determining member acting as an aperture stop for determining (limiting) a minimum f-number (Fno) light beam (hereinafter referred to as an "aperture stop"). STV1 and STV2 respectively represent a first variable stop and a second variable stop having an aperture diameter variable in accordance with the zoom position.

IP represents an image plane. When used as an imaging optical system of a video camera or a digital still camera, an image plane of a solid-state image sensor (photoelectric transducer), such as a CCD sensor or a CMOS sensor, is disposed. In addition, when used as an imaging optical system of a silver-halide film camera, a photosensitive plane corresponding to a film plane is disposed. In the spherical aberration diagram, a solid line indicates the d-line (at a wavelength of 587.6 nm), and a dotted line indicates the g-line (at a wavelength of 435.8 nm). In the astigmatism diagram, a dotted line indicates a meridional image plane, and a solid line indicates a sagittal image plane. In addition, the lateral chromatic aberration indicates a difference of the g-line with reference to the d-line.

Fno represents an F-number. A symbol A represents an imaging half angle of field (degrees). Note that, in the following embodiments, the wide-angle end and the telephoto end are zoom positions when a magnification-varying lens unit is located at each end of a mechanically movable range on the optical axis. In the lens cross-sectional view, an arrow indicates a movement locus of each lens unit for zooming from the wide-angle end to the telephoto end.

The zoom lens of the present invention includes two variable stops having an aperture diameter variable in accordance with a zoom position in the optical path. One of the two variable stops on the object side is referred to as the first variable stop STV1, and the other on the image side is referred to as the second variable stop STV2. Then, the following conditional expressions are satisfied:

$$0.90 < Sw1/Tkw < 1.50 \quad (1), \text{ and}$$

$$0.60 < Sw2/Tkw < 1.00 \quad (2),$$

where Sw1 represents a distance from the first variable stop STV1 to the image plane at the wide-angle end, Sw2 represents a distance from the second variable stop STV2 to the image plane at the wide-angle end, and Tkw represents a distance from an exit pupil position to the image plane at the wide-angle end.

The exit pupil position in the present invention is as follows. In general, an exit pupil position of an imaging optical system indicates an apparent position of the aperture stop STO viewed from the image plane. The aperture stop STO is required to have an aperture diameter that can be increased and decreased to make an arbitrary F-number for changing brightness or for changing a depth of field in the imaging optical system. When the aperture stop is narrowed to be a small diameter, it is necessary to arrange the aperture stop STO so that an off-axial light beam is not completely blocked but at least a part of the light beam from all image heights passes through the optical axis at the aperture stop position.

From the above description, the exit pupil position in the imaging optical system is set at a position close to an intersection between an extended line of the off-axis principal ray from the image side and the optical axis (although the positions do not completely match with each other because the principal ray changes due to an aperture eclipse and because of an influence of a difference between paraxial calculation and calculation in consideration of lens thickness).

In each embodiment, the aperture stop STO may also serve as the first variable stop STV1 or the second variable stop STV2.

The F-number FNO of the imaging optical system is expressed by FNO=|f/D|, where f represents a focal length, and D represents an aperture diameter at a rear principal point position. Therefore, in the zoom lens having a wide angle of field and a minimum f-number that is constant over the entire zoom range, it is necessary to set an aperture diameter at the telephoto end to be larger than an aperture diameter at the wide-angle end. Conversely, when the minimum f-number is used at the wide-angle end, it is necessary to narrow the axial light beam by a certain method even in the minimum f-number state.

The zoom lens described in Japanese Patent Application Laid-Open No. 2008-046208 includes, in addition to an aperture stop (hereinafter referred to as a main aperture stop) SP driven by a drive command from outside, a variable stop SSP having an effective diameter that changes in synchronization with zooming, disposed on the image side of the third lens unit. Further, the axial light beam is cut by the variable stop SSP so that the minimum f-number becomes constant in accordance with zooming. The zoom lens described in Japanese Patent Application Laid-Open No. 2008-233284 cuts the axial light beam by changing the diameter itself of the main aperture stop SP so that the minimum f-number becomes constant.

In either method, the effective diameter of a lens disposed near the aperture stop becomes larger than the aperture stop diameter of the minimum f-number at the wide-angle end. For this reason, a light beam having an intermediate image height is hardly cut by a lens near the aperture stop, and hence there is a tendency that the light intensity is increased. In contrast, a light beam near the maximum image height is greatly cut by the first lens unit as described above, and therefore there is a tendency that the peripheral light intensity is sharply decreased from the intermediate image height to the maximum image height.

Here the inventor(s) of the present invention made a hypothesis that a decrease of the peripheral light intensity becomes more conspicuous as the light attenuation ratio toward the maximum image height is larger even if the peripheral light intensity at the maximum image height is the same. This is based on the fact that human eyes are not sensitive to absolute brightness but are sensitive to relative brightness change. Based on this hypothesis, the light attenuation is not conspicuous if the decrease of the peripheral light intensity has characteristics of decreasing always at the same ratio as that of an image height change. Specifically, light intensity Ry at an image height y is expressed by the equation below:

$$Ry = RY^{(y/Y)},$$

where Y represents the maximum image height, y represents an evaluation image height, and RY represents the peripheral light intensity at the maximum image height.

In order to verify this hypothesis, three models having the same peripheral light intensity ratio at the maximum image height and different light attenuation characteristics were prepared, and simulation of the taken image was actually performed. The simulation image indicates the upper right part when the imaging screen is divided equally into four parts, namely upper right, upper left, lower right, and lower left parts. Therefore, the lower left corner of the simulation image corresponds to the center of the taken image, and the upper right corner of the simulation image corresponds to the extreme periphery of the screen of the taken image.

In the graph of FIG. 13, a first model indicated by (a) has characteristics in which light intensity of the intermediate image height is high and is sharply attenuated toward the periphery of the screen as described in Japanese Patent Application Laid-Open No. 2008-046208 or Japanese Patent Application Laid-Open No. 2008-233284 (FIG. 14A). In the graph of FIG. 13, a second model indicated by (b) has characteristics of being attenuated linearly toward the maximum image height (FIG. 14B). In the graph of FIG. 13, a third model indicated by (c) has characteristics according to the equation described above (FIG. 14C). It is quite obvious from these simulations of the taken image that the light attenuation at the periphery of the screen is not conspicuous in the third model indicated by (c) in the graph of FIG. 13 according to this hypothesis.

Therefore, the zoom lens of the present invention has light attenuation characteristics of the peripheral light intensity satisfying characteristics of the following conditional expression (3):

$$0.8 < Rwm/Rwe^{0.5} < 1.5 \quad (3),$$

where Rwm represents a peripheral light intensity ratio at a 50 percent image height (50 percent of the maximum image height from the screen center) at the wide-angle end, and Rwe represents a peripheral light intensity ratio at the maximum image height at the wide-angle end. Here, the peripheral light intensities Rwm and Rwe are as follows.

$Rwm = R_{0.5}/R_0$ and $Rwe = R_{1.0}/R_0$ are satisfied, where $R_0$ represents light intensity of the screen center, $R_{0.5}$ represents light intensity at the 50 percent image height, and $R_{1.0}$ represents light intensity at the maximum image height.

The conditional expression (3) is a conditional expression for making the peripheral light intensity ratio at the 50 percent image height with respect to the maximum image height close to an ideal curve of the peripheral light attenuation described above so as to make the peripheral light attenuation not conspicuous. If the upper limit value of the conditional expression (3) is exceeded, the peripheral light intensity ratio at the intermediate image height becomes too high with respect to the peripheral light intensity ratio at the maximum image height, and hence the peripheral light intensity is sharply decreased in the vicinity of the maximum image height. If the upper limit value of the conditional expression (3) is exceeded, the light intensity is conspicuously attenuated in the vicinity of the 50 percent image height where a main subject can exist. This results in an impression that the entire screen is dark, which is not preferred. It is more preferred that the conditional expression (3) satisfy the following conditional expression (3a).

$$0.90 < Rwm/Rwe^{0.5} < 1.45 \quad (3a)$$

In recent years, there has been adopted a method of using data concerning the decrease of the peripheral light intensity of the imaging lens so as to correct the peripheral light intensity by an image processing unit in the image pickup apparatus.

In this case, it is possible to eliminate the decrease of the peripheral light intensity in the entire area of the screen by using a reciprocal number of the peripheral light intensity ratio as the correction gain. In this case, however, if there is a rapid decrease of the peripheral light intensity as described in Japanese Patent Application Laid-Open No. 2008-046208 or Japanese Patent Application Laid-Open No. 2008-233284, the correction gain is sharply increased accordingly. If an optical axis displacement occurs due to a manufacturing error or a image stabilization function of the imaging optical system, there is a difference between a position where the peripheral light intensity is sharply decreased and a position where the correction gain is sharply increased, resulting in a correction error. From this viewpoint as well, if the decrease of the peripheral light intensity has ideal characteristics, the correction gain changes smoothly so that good correction can be performed.

Next, a specific lens structure for making the decrease of the peripheral light intensity close to an ideal form is described. A peripheral light intensity ratio T at an arbitrary image height is expressed as $T=E\times\cos^4\theta$, where $\theta$ (degrees) represents a half angle of field at the image height, and E represents aperture efficiency. The aperture efficiency is described briefly as follows. Ray tracing is performed from each of the image height and the optical axis position on the image plane to the object side, and then the aperture efficiency indicates an area ratio between blur images on an arbitrary non-image plane perpendicular to the optical axis on the object side.

If there is no aperture eclipse of the off-axial light beam and if the upper line and the lower line are both determined by the same aperture stop as that determining the axial light beam, the aperture efficiency is expressed by $1/\cos^3\theta$. In this case, the peripheral light intensity ratio is expressed by $T=\cos\theta$. The characteristics are different from the ideal characteristics of the peripheral light intensity described above and have the light attenuation ratio that increases from the intermediate image height to the extreme periphery. Therefore, in order to achieve the ideal characteristics of the peripheral light intensity, it is important how to decrease the aperture efficiency at the intermediate image height.

In general, the main aperture stop is disposed at a position near an intersection between a principal ray of the off-axial light beam and the optical axis. The position is close to the exit pupil position in a normal optical system. If the main aperture stop is disposed at a position where no off-axial light beam crosses the optical axis, the off-axial light beam is completely cut by the main aperture stop when the main aperture stop is in the small aperture stop state (when the aperture diameter is smallest). As a result, a shadow occurs at the periphery of the screen of the picked-up image (hereinafter this phenomenon is referred to as an "uneven aperture").

Here, if the aperture stop position is being shifted from the exit pupil position toward the image side in a range where the uneven aperture does not occur, the upper line is being cut by the aperture stop surface gradually from a low image height side, and in contrast, the lower line is shifted into. In addition, if the aperture stop position is being shifted from the exit pupil position toward the object side in the range where the uneven aperture does not occur, the lower line is being cut by the aperture stop surface gradually from the low image height side, and in contrast, the upper line is shifted into.

Therefore, the zoom lens of the present invention includes two variable stops having an aperture stop diameter that varies in accordance with zooming when the minimum f-number is used, which are disposed on the object side to some extent and on the image side to some extent from the exit pupil position. Thus, the upper line and the lower line at the intermediate image height at the wide-angle end are effectively cut so that the characteristics of the peripheral light intensity can be close to the ideal characteristics as described above.

Next, specific structure and conditions are described. The zoom lens of the present invention includes two variable stops having an aperture stop diameter that is determined in accordance with a zoom position when the minimum f-number is used. Among them, the first variable stop STV1 on the object side and the second variable stop STV2 on the image side are disposed at positions that satisfy the above-mentioned conditional expressions (1) and (2), respectively.

Next, the technical meaning of the conditional expressions (1) and (2) is described. The conditional expression (1) is a conditional expression for effectively cutting the lower line by the first variable stop STV1 on the object side. If the upper limit condition of the conditional expression (1) is not satisfied, a position of the first variable stop STV1 is too far from the exit pupil position so that the uneven aperture occurs. In addition, the lower line of the light beam is cut not only near the intermediate image height but also near the maximum image height. As a result, a difference between the peripheral light intensity ratios at the intermediate image height and at the maximum image height is not decreased, which is not preferred. If the lower limit condition of the conditional expression (1) is not satisfied, the position of the first variable stop STV1 becomes too close to the exit pupil position, and hence it becomes difficult to effectively cut the lower line at the intermediate image height.

Next, the conditional expression (2) is a conditional expression for effectively cutting the upper line by the second variable stop STV2 on the image side. If the lower limit condition of the conditional expression (2) is not satisfied, a position of the second variable stop STV2 is too far from the exit pupil position so that the uneven aperture occurs. In addition, the upper line of the light beam is cut not only near the intermediate image height but also near the maximum image height. As a result, a difference between the peripheral light intensity ratios at the intermediate image height and at the maximum image height is not decreased, which is not preferred. If the upper limit condition of the conditional expression (2) is not satisfied, the position of the second variable stop STV2 becomes too close to the exit pupil position, and hence it becomes difficult to effectively cut the upper line at the intermediate image height.

It is more preferred that the conditional expressions (1) and (2) satisfy the following conditional expressions (1a) and (2a).

$$0.95 < Sw1/Tkw < 1.30 \quad (1a)$$

$$0.65 < Sw2/Tkw < 0.95 \quad (2a)$$

Further, in this case, it is sufficient that one of the first variable stop STV1 and the second variable stop STV2 determines the F-number at the wide-angle end. It is not necessary that both of them are contacted with the axial light beam at the wide-angle end.

Next, a more preferable condition for the zoom lens of the present invention is described. At least one of lens surfaces adjacent to the first variable stop STV1 in the optical axis direction preferably has a shape with a convex surface facing the first variable stop STV1. In addition, at least one of lens surfaces adjacent to the second variable stop STV2 in the optical axis direction has a shape with a convex surface facing the second variable stop STV2. The first and second variable stops STV1 and STV2 do not contact with the optical axis because the first and second variable stops STV1 and STV2 are driven so that the apertures form concentric circles about the optical axis.

Therefore, it is possible to make positions of the variable stop surface and the lens before or after on the optical axis as close as possible to each other on the optical axis. In contrast, a certain space is necessary outside the effective diameter of the variable stop because a member for housing diaphragm blades, a drive mechanism, and the like are disposed thereon. Therefore, it is preferred that the lens surface adjacent to the variable stop have a shape with a convex surface facing the variable stop, because a space can be secured in a periphery with the smallest possible optical axis interval.

Next, the zoom lenses of Embodiments 1 to 3 of the present invention include, in order from the object side, the first lens unit having a negative refractive power, and the rear lens group LR that includes one or more lens units and has a positive refractive power as a whole over the entire zoom range. The zoom lenses of Embodiments 1 to 3 are retrofocus type zoom lenses, which can easily have a wider angle of field. As a matter of course, even for the positive-lead type zoom lens starting from the first lens unit having a positive refractive power as described in Embodiment 4, though it is difficult to realize a wider angle, which is not related to the object of the present invention, a sufficient effect can be obtained.

In the zoom lens of the present invention, it is preferred to satisfy one or more of the following conditional expressions:

$$0.15 < Es1t/En < 0.80 \quad (4), \text{ and}$$

$$0.15 < Es2t/En < 0.80 \quad (5),$$

where En represents a largest one of the effective diameters of lenses constructing the zoom lens, Es1t represents an effective diameter of the first variable stop STV1 at the telephoto end, and Es2t represents an effective diameter of the second variable stop STV2 at the telephoto end.

The conditional expressions (4) and (5) are conditional expressions for preventing the outer diameter of the main body from becoming too large even when two variable stops are disposed.

If the upper limit conditions of the conditional expressions (4) and (5) are not satisfied, the effective diameter of the variable stop exceeds the effective diameter of the first lens when combined with the drive mechanism for the variable stop disposed outside, resulting in a larger size of the main body. In addition, if the lower limit conditions of the conditional expressions (4) and (5) are not satisfied, although being preferable for downsizing of the entire system, it is necessary to reinforce the positive refractive power before and after the variable stop in the optical axis direction, which is not preferable because spherical aberration occurs. In addition, it is more preferred that the conditional expressions (4) and (5) satisfy the following conditional expressions (4a) and (5a).

$$0.20 < Es1t/En < 0.50 \quad (4a)$$

$$0.20 < Es2t/En < 0.50 \quad (5a)$$

Note that, the variable stop used in the zoom lens of the present invention may be an aperture stop that is driven mechanically in synchronization with zooming drive or may be a main aperture stop that is driven by a drive command from an external apparatus such as an image pickup apparatus. However, the minimum f-number means a brightest aperture stop state that can be used in a normal operation environment in combination with the external apparatus such as the image pickup apparatus.

In each embodiment, if a combined focal length fA of all the lens units disposed on the object side of the first variable stop STV1 is positive while a combined focal length fB of all the lens units disposed between the first variable stop STV1 and the second variable stop STV2 is negative, the light beam is greatly converged to the image side at the position of the first variable stop STV1. Conversely, if the combined focal length fA of all the lens units disposed on the object side of the first variable stop STV1 is negative while the combined focal length fB of all the lens units disposed between the first variable stop STV1 and the second variable stop STV2 is positive, the light beam is greatly diverged to the image side at the position of the first variable stop STV1.

In either case, an incident height of the axial light beam on the telephoto end side becomes conspicuously high on the positive side. In many cases, the effective diameter of the lens surface adjacent to the first variable stop STV1 is determined by the axial light beam.

At the wide-angle end, when the axial light beam is narrowed on the image side, an excess intermediate light beam can easily enter the lens surface adjacent to the first variable stop STV1. Therefore, when the first variable stop STV1 is narrowed at the zoom position in accordance with the axial light beam at the wide-angle end, the intermediate light beam can be efficiently cut.

Thus, in each embodiment, the peripheral light intensity ratio is appropriately controlled. A sign of the combined focal length fA of all the lens units disposed on the object side of the first variable stop STV1 is not changed over the entire zoom range. A sign of the combined focal length fB of all the lens units disposed between the first variable stop STV1 and the second variable stop STV2 is not changed over the entire zoom range. Further, the sign of the combined focal length fA is opposite to the sign of the combined focal length fB.

Note that, the lens unit in the present invention means a unit from the foreground surface of the optical system or the surface at which the interval with the front adjacent lens is changed for zooming to the rearmost surface of the optical system or the surface at which the interval with the rear adjacent lens is changed for zooming.

The zoom lens of the present invention can be variously applied to various optical instruments (for example, an image pickup apparatus such as a digital camera, an image projection apparatus, and other optical instruments).

Hereinafter, structures in the individual embodiments are described. The zoom lens of Embodiment 1 includes, in order from the object side to the image side, a first lens unit L1 having a negative refractive power, a second lens unit L2 having a positive refractive power, and a third lens unit L3 having a positive refractive power. The zoom lens of Embodiment 1 is a three-unit zoom lens having an entire imaging angle of field of 125 degrees at the wide-angle end, a zoom ratio of 2.06, and a minimum f-number of 4.10 over the entire zoom range.

$$l_{i \in R} \in \{obj, bkg\}$$

The individual lens units are moved for zooming from the wide-angle end to the telephoto end so that an interval between the first lens unit L1 and the second lens unit L2 is decreased while an interval between the second lens unit L2 and the third lens unit L3 is increased. The second lens unit L2 is moved to the image side for focusing from an object at infinity to a short distance object.

The aperture stop STO and the first variable stop STV1 are disposed on the object side of the second lens unit L2 and are moved along the same locus as the second lens unit L2 for zooming. The second variable stop STV2 is disposed in the third lens unit L3 and is moved along the same locus as the third lens unit L3 for zooming. The peripheral light intensity ratio at the wide-angle end satisfies the conditional expression (3), and the light attenuation characteristics are close to the ideal characteristics as shown in FIG. 2.

Positions of the first variable stop STV1 and the second variable stop STV2 satisfy the conditional expressions (1) and (2), and the lower line and the upper line at the intermediate image height are effectively cut, respectively, so that the conditional expression (3) is easily satisfied. In addition, in order to effectively secure the arrangement space for the first variable stop STV1, the lens surface adjacent to the image side of the first variable stop STV1 is a convex surface facing the first variable stop STV1. In addition, in order to effectively secure the arrangement space for the second variable stop STV2, the lens surface adjacent to the image side of the second variable stop STV2 is a convex surface facing the second variable stop STV2.

In addition, effective diameters of the first variable stop STV1 and the second variable stop STV2 on the telephoto end satisfy the conditional expressions (4) and (5), so as to achieve ideal characteristics of the peripheral light intensity without increasing the outer diameter of the main body by the drive mechanism for the variable stop.

The zoom lens of Embodiment 2 includes, in order from the object side to the image side, a first lens unit L1 having a negative refractive power, a second lens unit L2 having a positive refractive power, a third lens unit L3 having a positive refractive power, and a fourth lens unit L4 having a negative refractive power. The zoom lens of Embodiment 2 is a four-unit zoom lens having an entire imaging angle of field of 125 degrees at the wide-angle end, a zoom ratio of 2.06, and a minimum f-number of 4.10 over the entire zoom range.

The individual lens units are moved for zooming from the wide-angle end to the telephoto end so that an interval between the first lens unit L1 and the second lens unit L2 is decreased, an interval between the second lens unit L2 and the third lens unit L3 is decreased, and an interval between the third lens unit L3 and the fourth lens unit L4 is increased. The second lens unit L2 is moved to the image side for focusing from an object at infinity to a short distance object.

The aperture stop STO is constructed of the first variable stop STV1 and disposed on the object side of the second lens unit L2 and is moved along the same locus as the second lens unit L2 for zooming. The second variable stop STV2 is disposed on the image side of the third lens unit L3 and is moved along the same locus as the third lens unit L3 for zooming. The peripheral light intensity ratio at the wide-angle end satisfies the conditional expression (3), and the light attenuation characteristics are close to the ideal characteristics as shown in FIG. 5.

In this embodiment, the first variable stop STV1 also serves as the main aperture stop STO. Positions of the first variable stop STV1 and the second variable stop STV2 satisfy the conditional expressions (1) and (2), and the lower line and the upper line at the intermediate image height are effectively cut, respectively, so that the conditional expression (3) is easily satisfied. In addition, in order to effectively secure the arrangement space for the first variable stop STV1, the lens surface adjacent to the image side of the first variable stop STV1 is a convex surface facing the first variable stop STV1.

In addition, in order to effectively secure the arrangement space for the second variable stop STV2, the lens surface adjacent to the object side of the second variable stop STV2 is a convex surface facing the second variable stop STV2. In addition, effective diameters of the first variable stop and the second variable stop on the telephoto end satisfy the conditional expressions (4) and (5), so as to achieve ideal peripheral light attenuation without increasing the outer diameter of the main body by the drive mechanism for the variable stop.

The zoom lens of Embodiment 3 includes, in order from the object side to the image side, a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power. The zoom lens of Embodiment 3 is a six-unit zoom lens having an entire imaging angle of field of 82 degrees at the wide-angle end, a zoom ratio of 2.75, and a minimum f-number of 2.91 over the entire zoom range.

The first lens unit L1 to the fifth lens unit L5 (first lens unit to fifth lens unit) are moved for zooming from the wide-angle end to the telephoto end so that an interval between the first lens unit L1 and the second lens unit L2 is decreased, an interval between the second lens unit L2 and the third lens unit L3 is increased, an interval between the third lens unit L3 and the fourth lens unit L4 is decreased, an interval between the fourth lens unit L4 and the fifth lens unit L5 is increased, and an interval between the fifth lens unit L5 and the sixth lens unit L6 is increased. The fifth lens unit L5 is moved to the image side for focusing from an object at infinity to a short distance object.

The aperture stop STO is disposed on the image side of the third lens unit L3 and the first variable stop STV1 is disposed on the object side of the third lens unit L3. The aperture stop STO and the first variable stop STV1 are moved along the same locus as the third lens unit L3 for zooming. The second variable stop STV2 is disposed on the object side of the fourth lens unit L4 and is moved along the same locus as the fourth lens unit L4 for zooming. The peripheral light intensity ratio at the wide-angle end satisfies the conditional expression (3), and the light attenuation characteristics are close to the ideal characteristics as shown in FIG. 8.

Further, in Embodiment 3, the first variable stop STV1 is disposed closest to the object side of the third lens unit L3, and the second variable stop STV2 is disposed closest to the object side of the fourth lens unit L4. Positions of the first variable stop STV1 and the second variable stop STV2 satisfy the conditional expressions (1) and (2), and the lower line and the upper line at the intermediate image height are effectively cut, respectively, so that the conditional expression (3) is easily satisfied. In addition, in order to effectively secure the arrangement space for the second variable stop STV2, the lens surface adjacent to the image side of the second variable stop STV2 is a convex surface facing the second variable stop STV2.

Here, the first variable stop STV1 is a little disadvantageous in realizing a smaller size and higher performance because the lens surfaces on the object side and on the image side of the first variable stop STV1 are both convex surfaces, and because it is necessary to secure a space for disposing the variable stop. However, this is not related to making a decrease of the peripheral light intensity inconspicuous as an object of the present invention, and a sufficient effect can be obtained. In addition, effective diameters of the first variable stop STV1 and the second variable stop STV2 on the telephoto end satisfy the conditional expressions (4) and (5), so as to achieve ideal characteristics of the peripheral light intensity without increasing the outer diameter of the main body by the drive mechanism for the variable stop.

The zoom lens of Embodiment 4 includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. The zoom lens of Embodiment 4 is a five-unit zoom lens having an entire imaging angle of field of 83 degrees at the wide-angle end, a zoom ratio of 2.84, and a minimum f-number of 4.10 over the entire zoom range. The zoom lens of Embodiment 4 is of a positive-lead type. A negative-lead type is easy to realize a wider angle of field, while a positive-lead type is easy to realize a higher zoom ratio. The positive-lead type can also make a decrease of the peripheral light intensity inconspicuous as an object of the present invention. Namely, both the negative and positive lead types can similarly achieve the object.

In each lens unit, when zooming is performed from the wide-angle end to the telephoto end, an interval between the first lens unit L1 and the second lens unit L2 is increased, an interval between the second lens unit L2 and the third lens unit L3 is decreased, and an interval between the third lens unit L3 and the fourth lens unit L4 is increased. Further, the individual lens units move so that an interval between the fourth lens unit L4 and the fifth lens unit L5 is decreased. The second lens unit L2 moves to the object side for focusing from an object at infinity to a short distance object.

The aperture stop STO and the first variable stop STV1 are disposed on the object side of the third lens unit L3 and are moved along the same locus as the third lens unit L3 for zooming. The second variable stop STV2 is disposed in the third lens unit L3 and is moved along the same locus as the third lens unit L3 for zooming.

The peripheral light intensity ratio at the wide-angle end satisfies the conditional expression (3), and the light attenuation characteristics are close to the ideal characteristics as shown in FIG. 11. In addition, the zoom lens of Embodiment 4 includes the first variable stop STV1 disposed closest to the object side in the third lens unit L3 and the second variable stop STV2 disposed in the third lens unit L3. Positions of the first variable stop STV1 and the second variable stop STV2 satisfy the conditional expressions (1) and (2) so as to effectively cut the lower line and the upper line at the intermediate image height, and hence the conditional expression (3) is easily satisfied.

In addition, in order to effectively secure an arrangement space for the first variable stop STV1, the lens surface adjacent to the image side of the first variable stop STV1 is a convex surface facing the first variable stop STV1. In addition, in order to effectively secure an arrangement space for the second variable stop STV2, the lens surfaces adjacent to both sides of the second variable stop STV2 are both convex surfaces facing the second variable stop STV2. In addition, effective diameters of the first variable stop STV1 and the second variable stop STV2 at the telephoto end satisfy the conditional expressions (4) and (5), and achieve ideal characteristics of the peripheral light intensity without increasing the outer diameter of the main body by the drive mechanism for the variable stop.

The embodiments of the preferred optical system of the present invention are described above, but it is needless to say that the present invention is not limited to these embodiments, and various modifications and changes can be performed within the scope of the spirit thereof.

Next, an embodiment in which the zoom lens described in Embodiments 1 to 4 is applied to an image pickup apparatus is described with reference to FIG. 15. The image pickup apparatus of the present invention includes an interchangeable lens apparatus including the zoom lens, and a camera main body that is connected to the interchangeable lens apparatus via a camera mount portion in an attachable and detachable manner and includes an image sensor that receives an optical image formed by the zoom lens and converts the optical image into an electric image signal.

FIG. 15 is a schematic diagram of a main part of a single-lens reflex camera. In FIG. 15, an imaging lens 10 includes a zoom lens 1 of Embodiments 1 to 4. The zoom lens 1 is held by a lens barrel 2 as a holding member.

A camera main body 20 includes a quick return mirror 3 for reflecting a light beam from the imaging lens 10 to the upward direction, and a reticle plate 4 disposed in an image forming apparatus for the imaging lens 10. The camera main body 20 further includes a penta roof prism 5 for converting an inverse image formed on the reticle plate 4 into an erect image, and an eyepiece lens 6 for observing the erect image.

As a photosensitive plane 7, there is disposed a solid-state image sensor (photoelectric transducer) such as a CCD sensor or a CMOS sensor for receiving the image formed by the zoom lens, or a silver halide film. When picking up an image, the quick return mirror 3 is retracted from the optical path, and an image is formed on the photosensitive plane 7 by the imaging lens 10.

Benefits described in Embodiments 1 to 4 are effectively enjoyed by the image pickup apparatus disclosed in this embodiment. The present invention can be also applied to a mirrorless camera without the quick return mirror 3 as the image pickup apparatus.

Next, numerical embodiments corresponding to the respective embodiments of the present invention are described. In each numerical embodiment, i denotes an order of a surface from the object side, ri denotes a curvature radius of the lens surface, di denotes a lens thickness and an air interval between the i-th surface and the (i+1)th surface, and ndi and vdi respectively denote a refractive index and Abbe constant with respect to the d-line. BF denotes back focus, which is denoted by a distance from the last lens surface to an image plane. The total lens length is a distance from the first lens surface to the image plane. An aspherical shape is expressed by the following equation:

$$X = \frac{(1/R)H^2}{1+\sqrt{1-(1+K)(H/R)^2}} + A4 \times H^4 + A6 \times H^6 + A8 \times H^8 + A10 \times H^{10}$$

where the X axis corresponds to the optical axis direction, the H axis corresponds to the direction perpendicular to the optical axis, the light propagation direction is positive, R denotes a paraxial curvature radius, K denotes a conic constant, and A4, A6, A8, A10, A12, and A14 each denote an aspherical coefficient.

In addition, [e+X] means [$\times 10^{+x}$], and [e−X] means [$\times 10^{-x}$]. The aspherical surface is indicated by adding * as a suffix to surface number. In addition, the part where an interval d between optical surfaces is (variable) is changed for zooming, and the interval between surfaces corresponding to the focal length is shown in an annexed table.

In addition, the part where an effective diameter of each optical surface is (variable) is a variable stop that varies for zooming. The effective diameter corresponding to the focal length is shown in an annexed table in which a variable surface number is denoted by "eai". In addition, a relationship among the parameters, the conditional expressions, and the numerical embodiments are shown in Table 1.

(Numerical Embodiment 1)
Unit mm

Surface data

| Surface number | r | d | nd | vd | Effective diameter |
|---|---|---|---|---|---|
| 1* | 115.945 | 3.50 | 1.77250 | 49.6 | 84.00 |
| 2 | 32.057 | 6.64 | | | 60.74 |
| 3 | 37.090 | 3.50 | 1.58313 | 59.4 | 60.11 |
| 4* | 22.220 | 11.12 | | | 51.44 |
| 5 | 84.608 | 2.80 | 1.85400 | 40.4 | 50.36 |
| 6* | 34.842 | 9.29 | | | 37.87 |
| 7 | −140.769 | 2.00 | 1.59522 | 67.7 | 37.63 |
| 8 | 31.935 | 5.29 | | | 33.27 |
| 9 | −334.424 | 1.70 | 1.59522 | 67.7 | 33.24 |
| 10 | 53.829 | 2.33 | | | 32.88 |
| 11 | 47.178 | 6.44 | 1.83400 | 37.2 | 33.64 |
| 12 | −103.326 | (Variable) | | | 33.23 |
| 13 | ∞ | 0.50 | | | (ea13) (Variable) (First variable stop) |
| 14 (Stop) | ∞ | 0.50 | | | 19.16 |
| 15 | 23.766 | 1.00 | 1.91082 | 35.3 | 19.95 |
| 16 | 13.687 | 5.72 | 1.63980 | 34.5 | 19.17 |
| 17 | 231.365 | (Variable) | | | 19.10 |
| 18 | 68.274 | 4.52 | 1.54814 | 45.8 | 19.12 |
| 19 | −25.113 | 0.15 | | | 18.93 |
| 20 | −28.520 | 0.90 | 1.91082 | 35.3 | 18.63 |
| 21 | 60.759 | 0.15 | | | 18.68 |
| 22 | 24.868 | 3.66 | 1.59551 | 39.2 | 19.10 |
| 23 | 179.295 | 1.50 | | | 18.87 |
| 24 | ∞ | 0.00 | | | (ea24) (Variable) (Second variable stop) |
| 25 | 43.910 | 0.90 | 1.83481 | 42.7 | 18.58 |
| 26 | 13.206 | 4.82 | 1.49700 | 81.5 | 17.70 |
| 27 | 69.017 | 0.15 | | | 17.84 |
| 28 | 20.913 | 5.95 | 1.49700 | 81.5 | 18.23 |
| 29 | −22.463 | 0.15 | | | 17.89 |
| 30 | −43.477 | 0.90 | 1.77250 | 49.6 | 17.08 |
| 31 | 14.975 | 6.06 | 1.58313 | 59.4 | 17.67 |
| 32* | −75.778 | | | | 18.81 |

Aspherical surface data

First surface

K = 0.00000e+000    A4 = 6.63370e−006    A6 = −6.87415e−009
A8 = 6.26701e−012    A10 = −3.06214e−015    A12 = 6.75822e−019

Fourth surface

K = −6.27707e−001    A4 = 8.37327e−006    A6 = −2.71817e−008
A8 = 4.31896e−011    A10 = −9.33146e−014    A12 = 6.05602e−017

Sixth surface

K = −3.34645e+000    A4 = 1.77375e−005    A6 = −1.69043e−009
A8 = 1.35977e−010    A10 = −5.36943e−013    A12 = 1.00929e−015
A14 = −7.14368e−020

-continued (Numerical Embodiment 1)
Unit mm

Thirty-second surface

K = −3.63687e+000    A4 = 2.15160e−005    A6 = 3.32343e−008
A8 = 4.69301e−011    A10 = 8.60198e−014

Various data
Zoom ratio 2.06

|  | Wide angle | Intermediate | Telephoto |
|---|---|---|---|
| Focal length | 11.30 | 18.00 | 23.30 |
| F-number | 4.10 | 4.10 | 4.10 |
| Half angle of field (degree) | 62.42 | 50.24 | 42.88 |
| Image height | 21.64 | 21.64 | 21.64 |
| Total lens length | 172.19 | 161.28 | 162.86 |
| BF | 38.82 | 52.31 | 63.15 |
| d12 | 36.75 | 11.35 | 1.50 |
| d17 | 4.49 | 5.49 | 6.08 |
| ea13 | 14.02 | 16.79 | 19.16 |
| ea24 | 12.09 | 15.59 | 18.71 |
| Entrance pupil position | 25.82 | 24.48 | 23.67 |
| Exit pupil position | −36.20 | −37.99 | −39.09 |
| Front principal point position | 35.42 | 38.89 | 41.66 |
| Rear principal point position | 27.52 | 34.31 | 39.85 |

(Numerical Embodiment 2)
Unit mm

Surface data

| Surface number | r | d | nd | vd | Effective diameter |
|---|---|---|---|---|---|
| 1* | 154.958 | 3.50 | 1.77250 | 49.6 | 80.01 |
| 2 | 29.515 | 13.26 |  |  | 55.74 |
| 3 | 59.691 | 3.50 | 1.49710 | 81.6 | 55.12 |
| 4* | 21.978 | 6.87 |  |  | 43.30 |
| 5 | 104.438 | 2.80 | 1.85400 | 40.4 | 42.65 |
| 6* | 33.401 | 9.18 |  |  | 33.02 |
| 7 | −52.053 | 2.00 | 1.59522 | 67.7 | 32.89 |
| 8 | 58.197 | 2.63 |  |  | 31.92 |
| 9 | −633.593 | 1.70 | 1.59522 | 67.7 | 31.94 |
| 10 | 64.481 | 0.15 |  |  | 32.34 |
| 11 | 47.826 | 6.91 | 1.88300 | 40.8 | 32.92 |
| 12 | −68.507 | (Variable) |  |  | 32.79 |
| 13 (Stop) | ∞ | 0.50 |  |  | (ea13) (Variable) (First variable stop) |
| 14 | 24.007 | 1.00 | 1.91082 | 35.3 | 19.90 |
| 15 | 14.117 | 5.60 | 1.63980 | 34.5 | 19.19 |
| 16 | 291.885 | (Variable) |  |  | 19.13 |
| 17 | 45.984 | 4.52 | 1.53172 | 48.8 | 19.10 |
| 18 | −29.858 | 0.90 | 1.91082 | 35.3 | 18.80 |
| 19 | 83.230 | 0.15 |  |  | 18.84 |
| 20 | 31.063 | 4.41 | 1.59551 | 39.2 | 19.10 |
| 21 | −49.772 | 1.00 |  |  | 18.91 |
| 22 | ∞ | (Variable) |  |  | (ea22) (Variable) (Second variable stop) |
| 23 | −264.017 | 0.90 | 1.83481 | 42.7 | 17.29 |
| 24 | 13.003 | 4.68 | 1.49700 | 81.5 | 16.55 |
| 25 | 123.013 | 0.15 |  |  | 16.84 |
| 26 | 21.410 | 5.96 | 1.49700 | 81.5 | 17.60 |
| 27 | −19.958 | 0.15 |  |  | 17.78 |
| 28 | −37.618 | 0.90 | 1.77250 | 49.6 | 17.45 |
| 29 | 14.568 | 6.72 | 1.58313 | 59.4 | 18.14 |
| 30* | −49.967 |  |  |  | 19.37 |

-continued (Numerical Embodiment 2)
Unit mm

Aspherical surface data

First surface

K = 0.00000e+000    A4 = 7.88342e−006    A6 = −8.06096e−009
A8 = 7.93046e−012   A10 = −4.23301e−015   A12 = 1.01688e−018
Fourth surface K = −8.99792e−001    A4 = 2.36970e−006    A6 = −2.99695e−008
A8 = 3.31121e−011    A10 = −9.56668e−014   A12 = 1.00875e−016
Sixth surface K = −1.27164e+000    A4 = 2.17641e−005    A6 = −1.16704e−009
A8 = 2.38004e−010    A10 = −1.13731e−012   A12 = 2.73008e−015
A14 = −7.14368e−020
Thirtieth surface K = 2.15251e+000     A4 = 1.73997e−005    A6 = 2.42187e−008
A8 = −1.49596e−010   A10 = 7.48665e−013

Various data
Zoom ratio 2.06

|  | Wide angle | Intermediate | Telephoto |
|---|---|---|---|
| Focal length | 11.30 | 18.00 | 23.30 |
| F-number | 4.10 | 4.10 | 4.10 |
| Half angle of field (degree) | 62.42 | 50.24 | 42.87 |
| Image height | 21.64 | 21.64 | 21.64 |
| Total lens length | 170.49 | 158.25 | 158.74 |
| BF | 38.82 | 51.44 | 61.40 |
| d12 | 36.55 | 11.51 | 2.00 |
| d16 | 4.41 | 3.62 | 3.00 |
| d22 | 0.65 | 1.62 | 2.28 |
| ea13 | 14.13 | 16.80 | 19.08 |
| ea22 | 11.64 | 15.04 | 17.95 |
| Entrance pupil position | 24.09 | 22.78 | 22.00 |
| Exit pupil position | −39.67 | −39.29 | −38.91 |
| Front principal point position | 33.76 | 37.21 | 39.89 |
| Rear principal point position | 27.52 | 33.44 | 38.10 |

(Numerical Embodiment 3)
Unit mm

Surface data

| Surface number | r | d | nd | vd | Effective diameter |
|---|---|---|---|---|---|
| 1* | −3536.446 | 2.80 | 1.69680 | 55.5 | 64.84 |
| 2 | 35.284 | 17.40 |  |  | 50.92 |
| 3 | −55.444 | 2.50 | 1.83400 | 37.2 | 50.50 |
| 4 | −216.742 | 0.15 |  |  | 50.98 |
| 5* | 2337.982 | 4.41 | 1.80610 | 33.3 | 50.89 |
| 6 | −108.683 | (Variable) |  |  | 50.97 |
| 7 | 126.833 | 4.40 | 1.59282 | 68.6 | 40.32 |
| 8 | −215.994 | 0.15 |  |  | 39.95 |
| 9 | 63.119 | 2.00 | 1.84666 | 23.8 | 39.55 |
| 10 | 40.860 | 6.58 | 1.59282 | 68.6 | 38.53 |
| 11 | 1231.436 | 0.15 |  |  | 38.38 |
| 12 | 56.157 | 5.15 | 1.88300 | 40.8 | 38.23 |
| 13 | 1703.527 | (Variable) |  |  | 37.59 |
| 14 | ∞ | 3.20 |  |  | (ea14) (Variable) (First variable stop) |
| 15 | −103.863 | 1.30 | 1.83481 | 42.7 | 24.86 |
| 16 | 40.306 | 2.80 |  |  | 24.09 |
| 17 | −157.455 | 1.30 | 1.77250 | 49.6 | 24.17 |
| 18 | 34.604 | 4.60 | 1.84666 | 23.8 | 24.80 |
| 19 | −154.523 | 1.59 |  |  | 25.01 |

-continued (Numerical Embodiment 3)
Unit mm

| | | | | | |
|---|---|---|---|---|---|
| 20 (Stop) | ∞ | (Variable) | | | 25.17 |
| 21 | ∞ | 0.50 | | | (ea21) (Variable) (Second variable stop) |
| 22 | 167.675 | 1.30 | 1.84666 | 23.8 | 25.39 |
| 23 | 29.829 | 6.17 | 1.49700 | 81.5 | 25.45 |
| 24 | −52.379 | 0.60 | | | 25.87 |
| 25 | 37.055 | 5.04 | 1.59282 | 68.6 | 26.57 |
| 26 | −99.223 | (Variable) | | | 26.46 |
| 27 | 159.686 | 4.68 | 1.80809 | 22.8 | 25.90 |
| 28 | −35.978 | 0.15 | | | 25.75 |
| 29 | −35.672 | 1.30 | 1.80000 | 29.8 | 25.62 |
| 30 | 29.587 | (Variable) | | | 25.15 |
| 31* | 62.992 | 6.00 | 1.58313 | 59.4 | 36.23 |
| 32* | −255.446 | | | | 36.51 |

Aspherical surface data

First surface

K = 0.00000e+000   A4 = 4.35425e−006   A6 = −2.51656e−009
A8 = 1.78467e−012   A10 = −9.13769e−016   A12 = 3.72682e−019

Fifth surface

K = 0.00000e+000   A4 = −1.64478e−006   A6 = −1.16954e−010
A8 = 2.33247e−012   A10 = −4.06893e−015   A12 = 1.81352e−018

Thirty-first surface

K = 0.00000e+000   A4 = 1.88539e−006   A6 = −5.35257e−009
A8 = 3.55187e−011   A10 = −3.59578e−014   A12 = 8.23575e−030

Thirty-second surface

K = 0.00000e+000   A4 = 9.88843e−007   A6 = −6.10432e−009
A8 = 2.67166e−011   A10 = 1.33683e−014   A12 = −5.94584e−017

Various data
Zoom ratio 2.75

| | Wide angle | Intermediate | Telephoto |
|---|---|---|---|
| Focal length | 24.70 | 33.90 | 67.92 |
| F-number | 2.91 | 2.91 | 2.91 |
| Half angle of field (degree) | 41.22 | 32.55 | 17.67 |
| Image height | 21.64 | 21.64 | 21.64 |
| Total lens length | 212.10 | 200.69 | 174.10 |
| BF | 39.08 | 39.08 | 39.10 |
| d6 | 60.67 | 38.72 | 1.90 |
| d13 | 2.25 | 5.23 | 18.73 |
| d20 | 17.49 | 14.49 | 1.50 |
| d26 | 1.95 | 1.95 | 6.28 |
| d30 | 4.42 | 15.00 | 20.37 |
| ea14 | 21.58 | 23.53 | 26.33 |
| ea21 | 19.94 | 22.14 | 25.29 |
| Entrance pupil position | 34.38 | 33.95 | 44.32 |
| Exit pupil position | −56.24 | −78.59 | −64.25 |
| Front principal point position | 52.67 | 58.08 | 67.60 |
| Rear principal point position | 14.38 | 5.18 | −28.83 |

(Numerical Embodiment 4)
Unit mm

Surface data

| Surface number | r | d | nd | vd | Effective diameter |
|---|---|---|---|---|---|
| 1 | 244.225 | 2.00 | 1.84666 | 23.8 | 63.07 |
| 2 | 83.751 | 5.56 | 1.77250 | 49.6 | 58.74 |
| 3 | 320.295 | 0.15 | | | 58.01 |

-continued (Numerical Embodiment 4)
Unit mm

| | | | | | |
|---|---|---|---|---|---|
| 4 | 52.387 | 5.85 | 1.77250 | 49.6 | 53.82 |
| 5 | 117.578 | (Variable) | | | 52.66 |
| 6* | 84.539 | 1.50 | 1.88300 | 40.8 | 33.21 |
| 7 | 14.835 | 8.37 | | | 24.18 |
| 8 | −42.802 | 1.10 | 1.77250 | 49.6 | 23.79 |
| 9 | 33.406 | 0.15 | | | 22.97 |
| 10 | 28.090 | 7.38 | 1.74000 | 28.3 | 23.14 |
| 11 | −27.688 | 0.57 | | | 22.56 |
| 12 | −23.904 | 1.10 | 1.72000 | 43.7 | 22.16 |
| 13 | −61.111 | (Variable) | | | 21.74 |
| 14 | ∞ | 2.00 | | | (ea14) (Variable) (First variable stop) |
| 15 (Stop) | ∞ | 0.00 | | | 19.60 |
| 16 | 23.085 | 4.27 | 1.84666 | 23.8 | 20.79 |
| 17 | 1337.697 | 1.63 | | | 20.39 |
| 18 | −150.192 | 1.00 | 1.84666 | 23.8 | 19.89 |
| 19 | 15.019 | 7.31 | 1.49700 | 81.5 | 19.18 |
| 20 | −52.397 | 0.05 | | | 19.78 |
| 21 | ∞ | 0.10 | | | (ea21) (Variable) (Second variable stop) |
| 22 | 24.566 | 4.10 | 1.59282 | 68.6 | 20.18 |
| 23 | −253.590 | (Variable) | | | 19.73 |
| 24 | −52.684 | 2.48 | 1.84666 | 23.8 | 17.08 |
| 25 | −22.073 | 0.90 | 1.61340 | 44.3 | 16.95 |
| 26 | 45.671 | (Variable) | | | 16.20 |
| 27 | 76.888 | 5.18 | 1.49700 | 81.5 | 18.60 |
| 28 | −18.918 | 0.15 | | | 19.21 |
| 29 | −21.455 | 1.40 | 1.85400 | 40.4 | 19.14 |
| 30* | −54.615 | | | | 20.27 |

Aspherical surface data

Sixth surface
K = 0.00000e+000   A4 = 7.12321e−006   A6 = −7.50723e−009
A8 = 5.47249e−012   A10 = 1.03630e−014
Thirtieth surface K = 0.00000e+000   A4 = 1.88052e−005   A6 = 1.51555e−008
A8 = 2.92228e−010   A10 = −6.98610e−013

Various data
Zoom ratio 2.84

| | Wide angle | Intermediate | Telephoto |
|---|---|---|---|
| Focal length | 24.30 | 35.00 | 69.01 |
| F-number | 4.10 | 4.10 | 4.10 |
| Half angle of field (degree) | 41.68 | 31.72 | 17.41 |
| Image height | 21.64 | 21.64 | 21.64 |
| Total lens length | 133.59 | 138.76 | 164.80 |
| BF | 39.00 | 46.89 | 60.00 |
| d5 | 3.02 | 9.58 | 32.00 |
| d13 | 19.47 | 10.20 | 0.71 |
| d23 | 1.88 | 3.50 | 5.76 |
| d26 | 5.90 | 4.28 | 2.02 |
| ea14 | 13.70 | 15.46 | 18.60 |
| ea21 | 13.47 | 15.77 | 19.71 |
| Entrance pupil position | 29.67 | 38.44 | 85.39 |
| Exit pupil position | −30.96 | −29.79 | −28.10 |
| Front principal point position | 45.53 | 57.46 | 100.35 |
| Rear principal point position | 14.70 | 11.89 | −9.00 |

TABLE 1

| Conditional expression | | Embodiment 1 | Embodiment 2 | Embodiment 3 | Embodiment 4 |
|---|---|---|---|---|---|
| | fw | 11.30 | 11.30 | 24.70 | 24.30 |
| | ft | 23.30 | 23.30 | 67.9 | 69.01 |
| | Sw1 | 80.84 | 81.42 | 103.47 | 77.35 |
| | Sw2 | 57.75 | 58.93 | 71.19 | 61.09 |
| | Tkw | 75.02 | 78.49 | 95.32 | 69.96 |
| | Rwm | 0.61 | 0.63 | 0.63 | 0.71 |
| | Rwe | 0.19 | 0.22 | 0.22 | 0.33 |
| | En | 84.00 | 80.01 | 64.84 | 63.07 |
| | Es1t | 19.16 | 19.08 | 26.33 | 18.60 |
| | Es2t | 18.71 | 17.95 | 25.29 | 19.71 |
| (1) | Sw1/Tkw | 1.08 | 1.04 | 1.09 | 1.11 |
| (2) | Sw2/Tkw | 0.77 | 0.75 | 0.75 | 0.87 |
| (3) | $Rwn/Rwe^{0.5}$ | 1.40 | 1.34 | 1.33 | 1.24 |
| (4) | Est1/En | 0.23 | 0.24 | 0.41 | 0.29 |
| (5) | Est2/En | 0.22 | 0.22 | 0.39 | 0.31 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-003237, filed Jan. 11, 2013, which is hereby incorporated by reference herein in its entirety.

What is claimed is:

1. A zoom lens, comprising, in order from an object side to an image side, a first lens unit having a negative refractive power, a second lens unit having a positive refractive power, and a third lens unit having a positive refractive power, the lens units being configured to change intervals between the respective neighboring lens units for zooming, the zoom lens having an F-number which is constant over an entire zoom range, the zoom lens comprising a first variable stop and a second variable stop, the first variable stop being disposed between the first lens unit and the second lens unit and having an aperture diameter changing for zooming, the second variable stop being disposed in an image side of the first variable stop and having an aperture diameter changing for zooming, wherein the following conditional expressions are satisfied:

$0.90 < Sw1/Tkw < 1.50$, and $0.60 < Sw2/Tkw < 1.00$, where Sw1 represents a distance from the first variable stop to an image plane at a wide-angle end, Sw2 represents a distance from the second variable stop to the image plane at the wide-angle end, and Tkw represents a distance from an exit pupil position to the image plane at the wide-angle end.

2. A zoom lens according to claim 1, wherein the following conditional expression is satisfied:

$0.8 < Rwm/(Rwe)^{0.5} < 1.5$, where Rwm represents a peripheral light intensity ratio at a 50 percent image height at the wide-angle end, and Rwe represents a peripheral light intensity ratio at a maximum image height at the wide-angle end.

3. A zoom lens according to claim 1, wherein at least one of lens surfaces adjacent to the first variable stop in an optical axis direction is a convex surface facing the first variable stop.

4. A zoom lens according to claim 1, wherein at least one of lens surfaces adjacent to the second variable stop in an optical axis direction is a convex surface facing the second variable stop.

5. A zoom lens according to claim 1, wherein the following conditional expression is satisfied:

$0.15 < Es1t/En < 0.80$, where En represents a maximum effective diameter among effective diameters of lenses constructing the zoom lens, and Es1t represents an effective diameter of the first variable stop at a telephoto end.

6. A zoom lens according to claim 1, wherein the following conditional expression is satisfied:

$0.15 < Es2t/En < 0.80$, where En represents a maximum effective diameter among effective diameters of lenses constructing the zoom lens, and Es2t represents an effective diameter of the second variable stop at a telephoto end.

7. A zoom lens according to claim 1, wherein:
a sign of a combined focal length fA of all lens units disposed on the object side of the first variable stop is invariable over the entire zoom range;
a sign of a combined focal length fB of all lens units disposed between the first variable stop and the second variable stop is invariable over the entire zoom range; and
the sign of the combined focal length fA is opposite to the sign of the combined focal length fB.

8. A zoom lens comprising: in order from an object side to an image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power, the lens units being configured to change intervals between the respective neighboring lens units for zooming, the zoom lens having an F-number which is constant over an entire zoom range; and the zoom lens comprising a first variable stop and a second variable stop, the first variable stop being disposed in an object side of the third lens unit and having an aperture diameter changing for zooming, the second variable stop being disposed in an image side of the first variable stop and having an aperture diameter changing for zooming, wherein the following conditional expressions are satisfied:

$0.90 < Sw1/Tkw < 1.50$, and $0.60 < Sw2/Tkw < 1.00$, where Sw1 represents a distance from the first variable stop to an image plane at a wide-angle end, Sw2 represents a distance from the second variable stop to the image plane at the wide-angle end, and Tkw represents a distance from an exit pupil position to the image plane at the wide-angle end.

9. A zoom lens comprising, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, the lens units being configured to change intervals between the respective neighboring lens units for zooming, the zoom lens having an F-number which is constant over an entire zoom range, the zoom lens comprising a first variable stop and a second variable stop, the first variable stop being disposed in an object side of the third lens unit and having an aperture diameter changing for zooming, the second variable stop being disposed in an image side of the first variable stop and having an aperture diameter changing for zooming, wherein the following conditional expressions are satisfied:

$0.90 < Sw1/Tkw < 1.50$, and $0.60 < Sw2/Tkw < 1.00$, where Sw1 represents a distance from the first variable stop to an image plane at a wide-angle end, Sw2 represents a distance from the second variable stop to the image plane at the wide-angle end, and Tkw represents a distance from an exit pupil position to the image plane at the wide-angle end.

10. An image pickup apparatus, comprising:

a zoom lens comprising, in order from an object side to an image side, a first lens unit having a negative refractive power, a second lens unit having a positive refractive power, and a third lens unit having a positive refractive power, the lens units being configured to change intervals between the respective neighboring lens units for zooming, the zoom lens having an F-number which is constant over an entire zoom range, the zoom lens comprising a first variable stop and a second variable stop, the first variable stop being disposed between the first lens unit and the second lens unit and having an aperture diameter changing for zooming, the second variable stop being disposed in an image side of the first variable stop and having an aperture diameter changing for zooming, and wherein the following conditional expressions are satisfied:

$0.90 < Sw1/Tkw < 1.50$, and $0.60 < Sw2/Tkw < 1.00$, where Sw1 represents a distance from the first variable stop to an image plane at a wide-angle end, Sw2 represents a distance from the second variable stop to the image plane at the wide-angle end, and Tkw represents a distance from an exit pupil position to the image plane at the wide-angle end; and a photoelectric transducer for receiving an image formed by the zoom lens.

11. An image pickup apparatus, comprising:

a zoom lens comprising, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power, the lens units being configured to change intervals between the respective neighboring lens units for zooming, the zoom lens having an F-number which is constant over an entire zoom range, the zoom lens comprising a first variable stop and a second variable stop, the first variable stop being disposed in an object side of the third lens unit and having an aperture diameter changing for zooming, the second variable stop being disposed in an image side of the first variable stop and having an aperture diameter changing for zooming, wherein the following conditional expressions are satisfied:

$0.90 < Sw1/Tkw < 1.50$, and $0.60 < Sw2/Tkw < 1.00$, where Sw1 represents a distance from the first variable stop to an image plane at a wide-angle end, Sw2 represents a distance from the second variable stop to the image plane at the wide-angle end, and Tkw represents a distance from an exit pupil position to the image plane at the wide-angle end; and a photoelectric transducer for receiving an image formed by the zoom lens.

12. An image pickup apparatus, comprising:

a zoom lens comprising, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, the lens units being configured to change intervals between the respective neighboring lens units for zooming, the zoom lens having an F-number which is constant over an entire zoom range, the zoom lens comprising a first variable stop and a second variable stop, the first variable stop being disposed in an object side of the third lens unit and having an aperture diameter changing for zooming, the second variable stop being disposed in an image side of the first variable stop and having an aperture diameter changing for zooming, wherein the following conditional expressions are satisfied:

$0.90 < Sw1/Tkw < 1.50$, and $0.60 < Sw2/Tkw < 1.00$, where Sw1 represents a distance from the first variable stop to an image plane at a wide-angle end, Sw2 represents a distance from the second variable stop to the image plane at the wide-angle end, and Tkw represents a distance from an exit pupil position to the image plane at the wide-angle end; and a photoelectric transducer for receiving an image formed by the zoom lens.

* * * * *